United States Patent [19]

Hasegawa et al.

[11] Patent Number: 6,023,312
[45] Date of Patent: Feb. 8, 2000

[54] OPTICAL DEVICE WITH MEMORY FUNCTION EMPLOYING LIQUID CRYSTAL/ ORIENTATION-SUSTAINING MATERIAL COMPOSITE, AND METHOD FOR USING SAME

[75] Inventors: Naoki Hasegawa, Kasugai; Masaya Kawasumi, Anjo; Arimitsu Usuki, Nagoya; Akane Okada, Obu, all of Japan

[73] Assignee: Kabushiki Kaisha Toyota Chuo Kenkyusho, Aichi-gun, Japan

[21] Appl. No.: 08/736,725

[22] Filed: Oct. 25, 1996

[30] Foreign Application Priority Data

Oct. 26, 1995 [JP] Japan .................................... 7-279247
Apr. 23, 1996 [JP] Japan .................................... 8-101539

[51] Int. Cl.$^7$ ........................... G02F 1/133; G02F 1/137; G02F 1/1333
[52] U.S. Cl. ............................... 349/88; 349/23; 349/36
[58] Field of Search ................................ 349/88, 94, 23, 349/170, 36, 166

[56] References Cited

U.S. PATENT DOCUMENTS

| | | | |
|---|---|---|---|
| 4,527,862 | 7/1985 | Arakawa | 349/23 |
| 4,685,771 | 8/1987 | West et al. | 349/94 |
| 4,944,576 | 7/1990 | Lacker et al. | 349/86 |
| 5,223,959 | 6/1993 | Wu et al. | 349/86 |
| 5,409,744 | 4/1995 | Gotoh et al. | 349/89 |
| 5,621,552 | 4/1997 | Coates et al. | 349/86 |

FOREIGN PATENT DOCUMENTS

| | | |
|---|---|---|
| 63-294523 | 12/1988 | Japan . |
| 5-34668 | 2/1993 | Japan . |
| 6-200034 | 7/1994 | Japan . |

*Primary Examiner*—William L. Sikes
*Assistant Examiner*—Toan Ton
*Attorney, Agent, or Firm*—Oblon, Spivak, McClelland, Maier & Neustadt, P.C.

[57] ABSTRACT

An optical device employs a composite of a liquid crystalline substance and an orientation-sustaining material, such as a selected polymer, flat particles, or other material capable of sustaining the state of orientation of the liquid crystalline substance. The optical device has a memory function which is erased by the application of an electrical signal. External force for writing on the device generates local changes of the state of orientation of the liquid crystalline substance. The written display is memorized, and can be erased by the application of an electrical signal. When a two-frequency-driving liquid crystalline substance is used, the device has a long-term memory function. In this device, writing can be conducted at one frequency and erasure easily conducted at the other frequency. These optical devices can be used for light adjustment, display, and data storage.

11 Claims, 26 Drawing Sheets

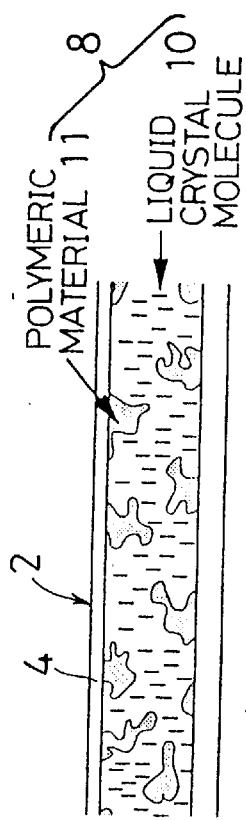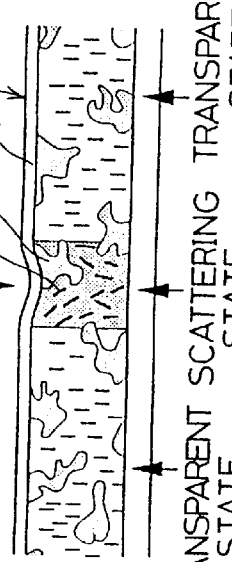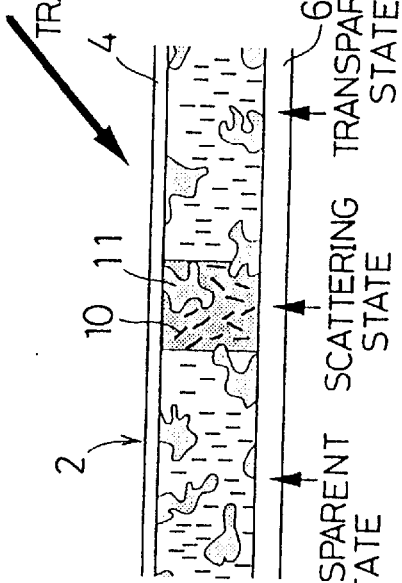

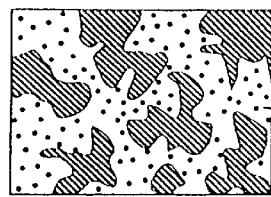
FIG.66(b')
← LIQUID CRYSTAL (PLAN VIEW)
FIG.66(a)
— (SIDE VIEW) —
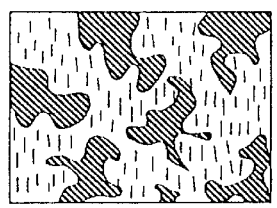
FIG.66(b)
FIELD DIRECTION
FIELD OFF
TRANSPARENT
LOW FREQUENCY ON
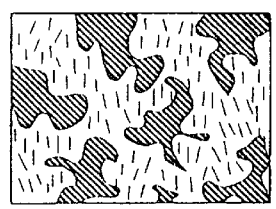
FIG.66(c)
TRANSPARENT
HIGH FREQUENCY ON
FIG.66(e)
SCATTERING
FIELD OFF
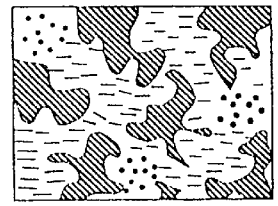
FIG.66(d)
FIELD DIRECTION
SCATTERING
(PLAN VIEW)
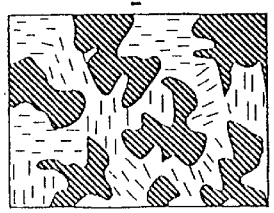
FIG.66(d')

OPTICAL DEVICE WITH MEMORY FUNCTION EMPLOYING LIQUID CRYSTAL/ ORIENTATION-SUSTAINING MATERIAL COMPOSITE, AND METHOD FOR USING SAME

BACKGROUND OF THE INVENTION

1. Field of the Invention

The present invention relates to an optical device which employs a composite comprising a liquid crystalline substance and an orientation-sustaining material such as a selected polymer or flat particulates capable of sustaining the orientation of the liquid crystalline substance. This optical device is provided with a memory function, and is characterized by the fact that liquid crystal orientation is sustained until electrical signals are applied to cancel it. The optical device can be used for light adjustment, displays, and data storage.

2. Description of the Prior Art

The technology for fabricating liquid crystal/polymer composites comprising transparent polymer materials which have closed or open cells and a liquid crystalline substance which fills these cells is generally known. It is also generally known that such composites can be used in optical devices. The light-reflecting characteristics and light-transmitting characteristics of such composites change depending on the state of the liquid crystalline substance. For example, the composite may be used for light adjustment by switching its state between a transparent state and a light-scattering state. It is also possible to display a pattern by locally changing light reflection or light transmission in a prescribed area. The composite can also be used for data storage by combining it with readout technology.

It is common practice to employ an electric field or external force in order to switch the state of liquid crystal orientation. In ordinary optical devices employing a liquid crystalline substance, when the electric field or external force ceases to be applied, the liquid crystal orientation returns from the state prevailing during application of the electric field or external force to the state of orientation prevailing prior to application of the electric field or external force. On the other hand, some devices have a feature that the state of orientation under electric field or external force is sustained and does not return to the state of orientation prevailing prior to application of the electric field or external force even after the removal of the electric field or external force. In this specification, this sustaining characteristic is termed as "memory" or "memory function".

Japanese Laid-Open Patent Application 5-34668 discloses a technology for endowing liquid crystal/polymer composites with memory. In this technique, a compound that has hydroxyl groups is introduced into a polymeric material. The hydroxyl groups interact with the liquid crystal molecules in such a way that the state of orientation prevailing during application of the electric field is sustained even after the electric field has ceased to be applied, thus endowing the composite with memory. In other words, the hydroxyl groups of the polymeric material which encloses the liquid crystalline substance endow the liquid crystalline substance with memory, whereby the state of liquid crystal orientation prevailing during application of the electric field is sustained even after the electric field has ceased to be applied.

When a composite is endowed with memory, it is desirable to also make erasure possible. In the technique disclosed in Japanese Laid-Open Patent Application 5-34668, the liquid crystal/polymer composite is heated in order to return it from the state of orientation prevailing during application of the electric field (the state of orientation sustained by the hydroxyl groups) to the state prevailing prior to application of the electric field. In this Specification, the action of returning the state of liquid crystal orientation to the state prevailing prior to application of the electric field or external force is termed "erasure". In the technique disclosed in Japanese Laid-Open Patent Application 5-34668, erasure is effected through heating.

It is generally difficult to incorporate heating devices having relatively high power requirements into ordinary optical devices employing liquid crystalline substances. Even where possible, this raises the cost of the device, or increases the power consumption of the device.

Japanese Laid-Open Patent Application 63-294523 discloses a completely different technique for endowing an optical device with memory. In this technique, a liquid crystal display comprising a laminate consisting of a transparent surface protection film that can be deformed by external force, a liquid crystal layer, and a substrate is proposed. In this liquid crystal display device, writing can be performed using external force in order to produce optical contrast by changing the state of liquid crystal orientation between the areas of the surface protection film which are deformed by external force and the areas that are not deformed. In this technique, the memory effect is produced by inhibiting creep restoration of the surface protection film that has been deformed by external force so that the shape of the surface protection film after the application of external force has ceased remains the same as the shape produced by the application of external force.

In this technique, the memory effect is produced not by using a composite of liquid crystals and an orientation-sustaining material, but rather by inhibiting creep restoration of the surface protection film. Although creep restoration of the surface protection film is inhibited, it remains difficult for the surface protection film to retain for long periods the shape produced by the application of external force in the absence of the application of external force, so it is difficult to achieve memory sustained over extended periods of time using the technique disclosed in Japanese Laid-Open Patent Application 63-294523. Even assuming that it were possible to completely prevent creep restoration of the surface protection film and thereby to sustain memory over extended periods of time, this would in turn give rise to the problem of difficulty in erasure.

SUMMARY OF THE INVENTION

An object of the present invention is to provide an optical device having stable memory which employs a composite comprising a liquid crystalline substance and an orientation-sustaining material, wherein the device does not require a heating device for erasure.

A further object of the present invention is to provide an optical device having stable memory which employs a composite comprising a liquid crystalline substance and an orientation-sustaining material, wherein the device employs electrical signals for both writing and erasure.

A further object of the present invention is to provide an optical device having stable memory which employs a composite comprising a liquid crystalline substance and an orientation-sustaining material, wherein the device can be written to by the application of external force, such as by a person writing with a pen.

A further object of the present invention is to provide a device capable of gradation display in accordance with the magnitude of the external force applied.

A preferable embodiment of the present invention can be utilized in a display device which employs a liquid crystalline substance. This liquid crystal display device comprises a pair of substrates and a liquid crystal composition provided between the pair of substrates. At least one member of the pair of substrates is transparent and at least one member of the pair of substrates is capable of elastic deformation by the application of external force. The liquid crystal composition is a composite which comprises a liquid crystalline substance and an orientation-sustaining material capable of sustaining a state of orientation of the liquid crystalline substance. According to this device having above features, a state of orientation is produced by applying external force to at least one member of the pair of substrates capable of elastic deformation, and this state is sustained for memory function by the orientation- sustaining material even after the removal of the external force.

When external force is applied to one of the substrates capable of elastic deformation in order to deform the substrate, the liquid crystal composition becomes deformed in the areas of deformation. As a result of this deformation, the molecular orientation of the liquid crystal in these areas becomes disordered. Thus, optical contrast is produced between the area of disordered liquid crystal orientation and the areas of ordered liquid crystal orientation. This permits writing through the application of external force. Even after the application of external force has ceased and substrate deformation has recovered, the molecular orientation of the liquid crystal in these areas is sustained by the orientation-sustaining material. As a result, the molecular orientation of the liquid crystal in the areas deformed by external force remains different from the molecular orientation in other areas even after the application of external force has ceased. Thus, optical contrast is sustained, enabling continuous display.

Another aspect of the invention can be utilized in an optical device for various purposes. This optical device comprises a pair of substrates, and a liquid crystal composition provided between the pair of substrates. In the optical device, the liquid crystal composition is a composite which comprises a liquid crystalline substance and an orientation-sustaining material capable of sustaining a state of orientation of said liquid crystalline substance. The sustained state of orientation of the liquid crystal composition can be changed through application of electrical energy more than a level necessary to sustain the state of orientation of the liquid crystalline substance by the orientation-sustaining material.

The sustained state can be changed by applying to the liquid crystal composition electrical energy at a level above that by which the orientation-sustaining material sustains the liquid crystal orientation, thereby erasing. For this purpose, it is favorable to use a liquid crystalline substance that has positive dielectric anisotropy at some given frequency. When such a liquid crystalline substance is used, the long axes of the liquid crystal molecules can be made to align parallel to the electric field direction through the application of voltage of a frequency at which the liquid crystals have positive dielectric anisotropy, thus producing a transparent state. When external force is applied to the device in the transparent state, the liquid crystal composition is deformed in areas of application of the external force, and the molecular orientation of the liquid crystal in the areas becomes disordered. Reorientation of this disordered molecular orientation is restricted by the orientation-sustaining material, and, as a result, a state of molecular orientation different from that of the transparent state is sustained in these areas even after the external force is no longer applied. Thus, in the deformed areas, a state of disordered molecular orientation, that is, a light scattering state, is sustained, so that a state in which there is optical contrast between the deformed areas and the other transparent areas is sustained. When a voltage of a frequency at which the liquid crystals have positive dielectric anisotropy is again applied, the long axes of the liquid crystal molecules are realigned parallel to the field direction, and the material returns to the transparent state. Thus, the written display is erased.

The liquid crystal composition comprises a light scattering liquid crystalline substance, making a bright display possible and obviating the need for an oriented film, polarizer, or similar component.

The orientation-sustaining material is preferably a polymeric material which is transparent, which is combined with the liquid crystalline substance in such a way that the liquid crystalline substance forms a continuous phase or a discontinuous phase, and which possesses functional groups that sustain the state of molecular orientation of the liquid crystal. Alternatively, flat particles which exhibit affinity for the liquid crystal molecules may be dispersed throughout the liquid crystalline substance. When such orientation-sustaining materials are used, the molecular orientation of the liquid crystal disordered by the application of external force is sustained. The greater the external force applied, the greater the extent of disordering of the molecular orientation of the liquid crystal, which results in a greater magnitude of light scattering, producing strong optical contrast with respect to the other areas. When weak external force is applied, marked disordering of orientation is small and the magnitude of light scattering is small, so optical contrast with respect to the other areas is weak. The particular state of molecular orientation of the liquid crystal resulting from disorder of a magnitude corresponding to the magnitude of the external force is sustained by the orientation-sustaining material, thus making possible a gradation display in which optical contrast of a particular degree is sustained.

When a transparent substrate capable of elastic deformation is used, it becomes possible to read from the side at which external force is applied.

The present invention can also be embodied as a light adjustment device, or as a display device, optical data storage device, or other optical device. This optical device comprises a pair of substrates and a liquid crystal composition provided between the pair of substrates, and is characterized by the fact that the liquid crystal composition is a composite which comprises a liquid crystalline substance and an orientation-sustaining material capable of sustaining the state of orientation of the liquid crystal; and the orientation of the liquid crystal can be changed, through the application to it of electrical energy at a level above that at which the orientation-sustaining material sustains the liquid crystal orientation, from a state in which the orientation of the liquid crystal is sustained by the orientation-sustaining material.

Another aspect of the present invention relates to a method for erasing a display or storage of data of an optical device equipped with memory. This erasure method comprises the step of changing the state of orientation by applying electrical energy more than a level necessary to sustain the state of orientation by the orientation-sustaining material.

When the optical device and erasure method are used, the liquid crystalline substance and the orientation-sustaining material which sustains the orientation of the liquid crystalline substance serve, on the one hand, to ensure stable memory over extended periods of time, and on the other to allow erasure to be conducted through a simple operation by means of the simple procedure of applying electrical energy, thus affording a highly reliable and practical optical device.

Another aspect of the present invention achieves an optical device wherein both writing and erasing operations can be accomplished using electrical signals. This optical device comprises a liquid crystal/polymer composite provided between a pair of substrates, and is characterized by the fact that the liquid crystal/polymer composite comprises a transparent polymer material which has closed or open cells, and a liquid crystalline substance which fills these cells; the liquid crystalline substance is a two-frequency-driving liquid crystalline substance; and the polymeric material has a functional group which sustains an orientation of the two-frequency-driving liquid crystalline substance after the removal of an electric field.

Regarding this liquid crystal/polymer composite, where the polymeric material has closed cells and the liquid crystal is enclosed within these closed cells, the liquid crystal is completely surrounded by the polymeric material. Where the polymeric material has open cells and the liquid crystal is enclosed within these open cells, the liquid crystalline substance is at least partly surrounded by the polymeric material. Where a two-frequency-driving liquid crystalline substance is used as the liquid crystalline substance, the liquid crystal molecules are either oriented parallel to the field direction or oriented perpendicular to the field direction, depending on the frequency of the applied field. Molecular orientation has a tendency to become random when application of the field is halted. On the other hand, the polymeric material selected has functional groups that have the capacity to sustain the molecular orientation of the liquid crystalline substance produced by application of the electric field even after application of the electric field has ceased.

In the present invention, the use of a liquid crystal/polymer composite which comprises a two-frequency-driving liquid crystalline substance and a prescribed polymeric material to produce a light scattering liquid crystal display device offers the following merits. "Orienting" here refers primarily to movement whereby numerous liquid crystal molecules are aligned regularly in a certain configuration, and "orientation" refers primarily to a state wherein numerous liquid crystal molecules have become aligned in a regular arrangement.

FIG. 66 depicts a liquid crystal cell comprising a liquid crystal/polymer composite in which the liquid crystal forms a continuous phase. The liquid crystal drive action described below is the same for liquid crystal/polymer composites in which the liquid crystal forms a discontinuous phase enclosed in closed cells.

In the liquid crystal cell depicted in FIG. 66, just after the preparation of the cell, the liquid crystal molecules have completely random orientation and are in a light scattering state (see FIG. 66(a)).

An electric field of a frequency such that the dielectric anisotropy of the liquid crystal becomes positive is applied between the electrodes. The liquid crystal molecules orient parallel to the field direction in all areas of the cell, and assume a transparent state (see FIGS. 66(b), (b')).

When application of the electric field is subsequently halted, interaction of the polymeric material and liquid crystal serves to sustain the state of liquid crystal molecular orientation so that the liquid crystal molecules do not return to random orientation, but rather remain oriented parallel to the field direction. As a result, a transparent state is memorized (see FIG. 66(c)).

When an electric field with a frequency of dielectric anisotropy in the negative region is applied, the liquid crystal molecules orient perpendicular to the field direction. However, in the case of orientation perpendicular to the field direction, there is a certain degree of freedom with regard to liquid crystal molecule orientation within the plane in the perpendicular direction, in addition, the orientation is affected by the interface with the polymeric material, which is present in three dimensions [around the liquid crystal]. Thus, the direction in which the liquid crystal molecules point within the plane perpendicular to the field direction differs somewhat in each domain in which the liquid crystal molecules are substantially surrounded by the polymeric material (see FIGS. 66(d), (d')). This state is a light scattering state.

Under these conditions, when application of the electric field is halted, the molecular orientation of the liquid crystal is sustained due to interaction of the polymeric material and the crystal such that the light scattering state is memorized.

The two-frequency-driving liquid crystalline substance used in the present invention is a liquid crystal whose dielectric anisotropy assumes a different sign depending on the frequency applied. An example is a liquid crystal whose molecules orient parallel to the field direction when a low frequency is applied, but which orient perpendicular to the field direction when a high frequency is applied. Various types of two-frequency-driving liquid crystalline substances can be used; examples will be given later.

With the optical device depicted in FIG. 66, the liquid crystal is switched to a transparent state by applying an electrical signal of one of the two driving frequencies that drive the liquid crystal. It can be switched to a light scattering state by applying an electrical signal of the other driving frequency. Used in this way, light adjustment can be effected by changing the light reflectance or transmittance. Alternatively, an electrical signal of one of the two driving frequencies can be applied locally to produce areas of local light transparency, and an electrical signal of the other driving frequency applied to the region surrounding this area in order to switch this region to a light scattering state. Conversely, the background can be made transparent, with writing effected by rendering the display locally light scattering. Used in this way, it is possible to produce a display that has contrast by changing light reflectance or transmittance locally in order to display a pattern. By combining the device with a device for reading out the display pattern, it is possible to use it as a data storage device.

A better understanding of the present invention can be obtained by reading the claims and the following embodiments while referring to the drawings.

BRIEF DESCRIPTION OF THE DRAWINGS

FIGS. 1(a) to 1(c) are diagrams illustrating the processes of input, display, and erasure when a liquid crystal/polymer composite is used as the liquid crystal composition.

FIGS. 66(a), 66(b), 66(b'), 66(c), 66(d), 66(d') and 66(e) are illustrations of an example of the behavior of the liquid crystalline substance in a second embodiment.

DETAILED DESCRIPTION OF THE PREFERRED EMBODIMENTS

Figure 2A:
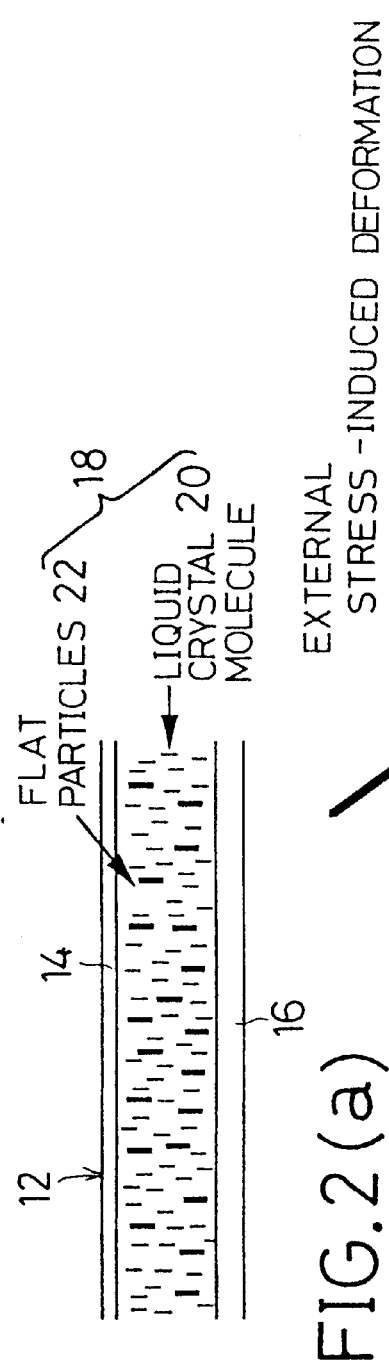
FIGS. 2(a) to 2(c) are diagrams illustrating the processes of input, display, and erasure when a liquid crystal/flat particle composite is used as the liquid crystal composition.

Light scattering liquid crystal composition which comprises a composite of a liquid crystalline substance and a polymeric material can be broadly divided into so-called PDLC (polymer dispersed liquid crystal) types, in which a liquid crystal fills the cells of a transparent polymeric material having closed cells, forming a discontinuous phase, and so-called PNLC (polymer network liquid crystal) types, in which the liquid crystal fills the open pores of a transparent polymeric material that has open pores, forming a continuous phase.

In the absence of an applied electric field, these PDLC and PNLC light scattering liquid crystal composition assume a light scattering state in which the liquid crystal molecules are oriented randomly; when a field is applied, the liquid crystal aligns to assume a transparent state. However, even though a transparent state has been assumed, the liquid crystal molecules return to random orientation once the field has been shut off, and resume the original light scattering state. It was therefore necessary to apply a field continuously in order to sustain a transparent state.

The technology disclosed in Japanese Laid-Open Patent Application 5-34668 was proposed in order to solve this problem. In this technique, a compound containing hydroxyl groups is introduced into the polymeric material in a PDLC or PNLC. Interaction between the hydroxyl groups and the liquid crystal molecules serves to sustain the orientation of the liquid crystal molecules even after the field has been shut off, thereby affording a memory function. While this method affords a memory function whereby orientation is sustained even after a field is no longer applied, it is necessary to subsequently heat the liquid crystal in order to produce an isotropic phase so that the state of liquid crystal molecular orientation which is sustained by the hydroxyl groups may be dissolved and returned to a light scattering state. In other words, a heating means is required to change light transmission. Thus, there are significant restrictions in terms of actual device architecture.

A technology which provides a liquid crystal display element that can be written on by pen pressure or finger pressure is disclosed in Japanese Laid-Open Patent Application 63-294523. This technique proposes a liquid crystal display element comprising a laminate of a transparent surface protection film that can be deformed by external force, a liquid crystal layer, and a substrate.

Writing by means of external force can be performed utilizing the fact that optical contrast is produced through changes of the state of liquid crystal molecular orientation between the areas of the surface protection film which are deformed by external force and the areas that are not deformed. In this technique, the memory effect is produced by inhibiting the natural tendency of liquid crystal molecular orientation to return to the state prior to the application of external force once the external force is no longer applied. In other words, the inhibition of creep restoration of the surface protection film, regulation of liquid crystal viscosity, and inhibition of the orientation force of the oriented film are taught.

Although creep restoration of the surface protection film is inhibited, it is impossible to prevent creep restoration over prolonged periods of time, with the result that the orientation of the liquid crystal returns to its natural state due to creep restoration so that the display gradually disappears. In addition, although orientation force can be inhibited, it is impossible to reduce orientation force to zero, so the display eventually disappears. Thus, it is not possible to achieve sustained display over extended periods.

The use of a ferroelectric liquid crystal with high viscosity makes it possible for the display to be sustained over longer periods than with the previous two designs, but it remains exceedingly difficult to achieve sustained display over extended periods.

Thus, in conventional techniques which do not employ an orientation-sustaining material to achieve memory, it is not possible to sustain stable memory function over extended periods.

The first embodiment of the present invention proposed here was developed to overcome this drawback. The liquid crystal display device which pertains to this embodiment comprises a pair of substrates and a liquid crystal composition. At least one of the substrates is transparent, and at least one of them is capable of being elastically deformed by external force. The same substrate can serve as both the transparent and elastically deformable substrate, or the transparent substrate and elastically deformable substrate may be different substrates. The liquid crystal composition is packed between the substrates. It contains a liquid crystalline substance and an orientation-sustaining material capable of sustaining the state of molecular orientation of this liquid crystalline substance.

Specific Examples Are Described Below

Liquid Crystalline Substance

A single liquid crystalline substance may be used alone, or a mixture of two or more liquid crystalline substances may be used. In general, it is desirable to use a mixture of two or more liquid crystalline substances in order to achieve a liquid crystal having the various required properties.

It is preferable for the liquid crystalline substance to have positive dielectric anisotropy at some given frequency. A liquid crystalline substance that has both positive and negative dielectric anisotropy depending on the frequency (two-frequency-driving liquid crystalline substance) may be used, as long as the substance has positive dielectric anisotropy at some given frequency. The intended objective can be achieved through selection of the appropriate frequency. When a liquid crystal mixture is used, some of a liquid crystalline substance having negative dielectric anisotropy can be included, as long as the liquid crystal mixture as a whole has positive dielectric anisotropy at some given frequency.

The use of a nematic liquid crystal is preferred due to the good field response when the display is erased by applying an electric field; however, cholesteric or smectic materials may be used as long as they exhibit the required field response. While there are no particular restrictions regarding the molecular weight of the liquid crystal molecules, low-molecular weight substances offer better field response, allowing the threshold value of the field used to erase the display to be set to a low level. "Low molecular weight" differs depending on the particular chemical structure of the liquid crystal molecule, but here refers, for example, to a molecular weight of 1,000 or lower.

Figure 8:
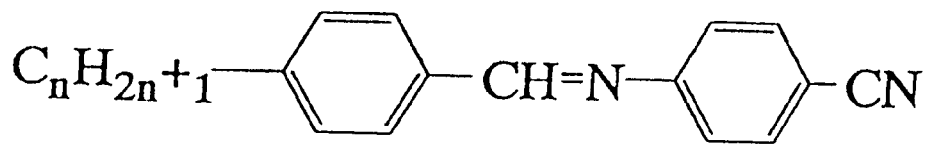
FIGS. 8 through 65 are chemical formulas for liquid crystalline substances that can be used in the present invention.
Figure 9:
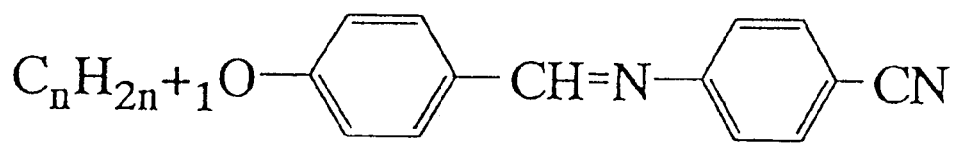
Figure 10:
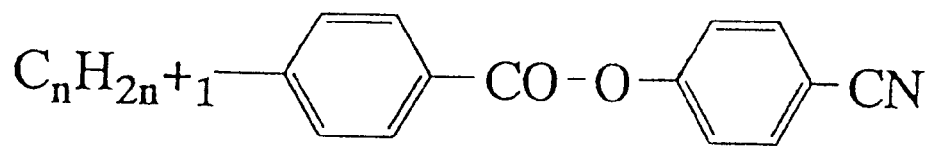
Figure 11:
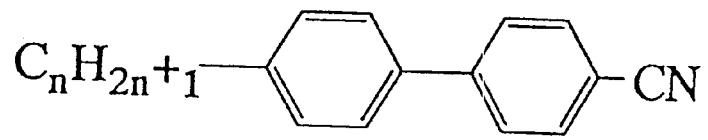
Figure 12:
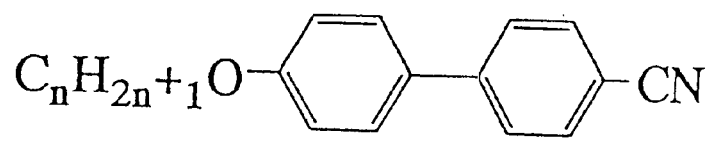
Figure 13:
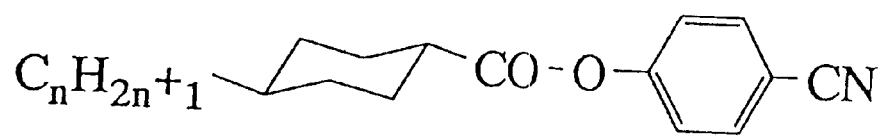
Figure 14:
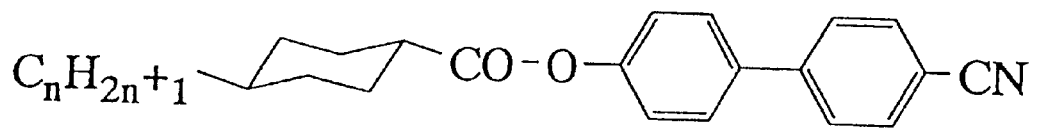
Figure 15:
Figure 16:
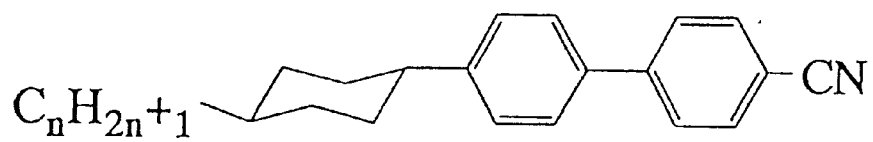
Figure 17:
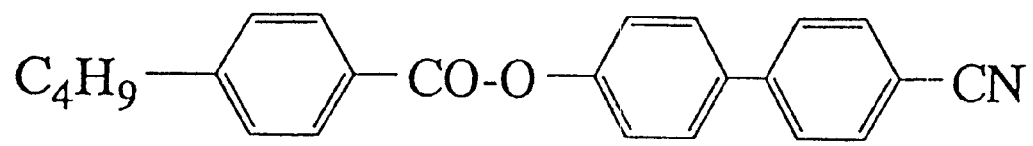
Figure 18:
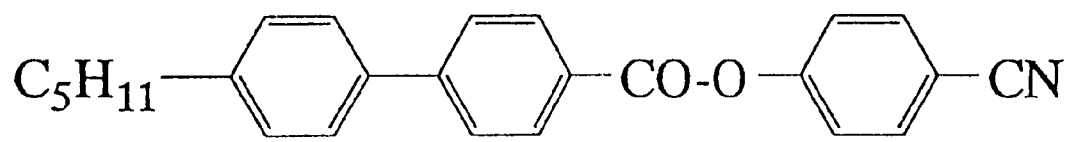
Figure 19:
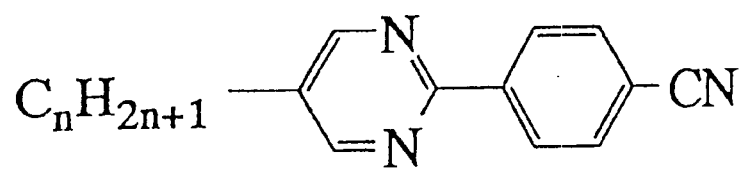
Figure 20:
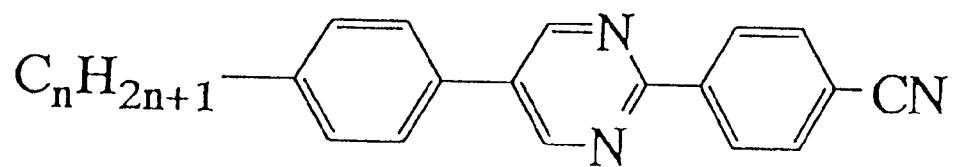
Figure 21:
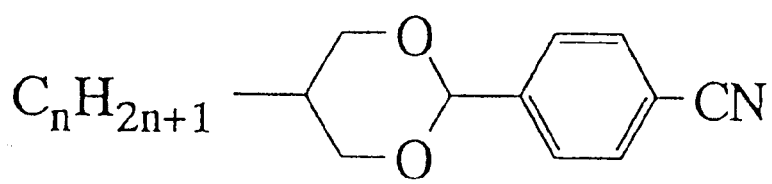
Figure 22:
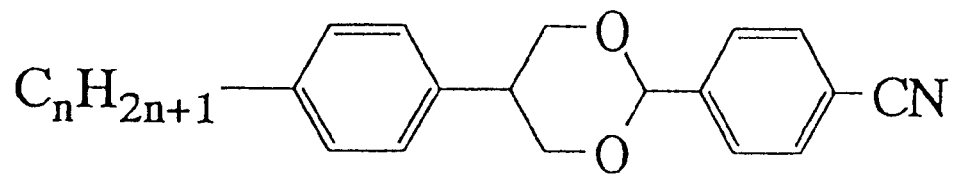
Figure 23:
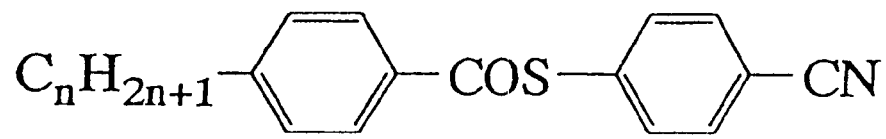
Figure 24:
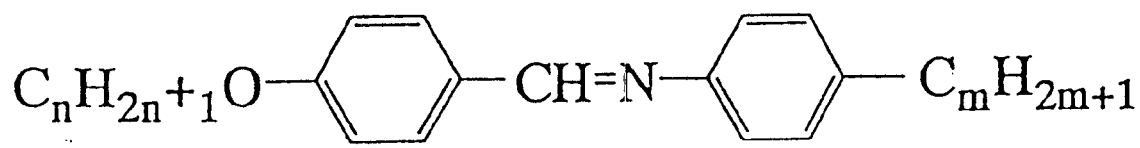
Figure 25:
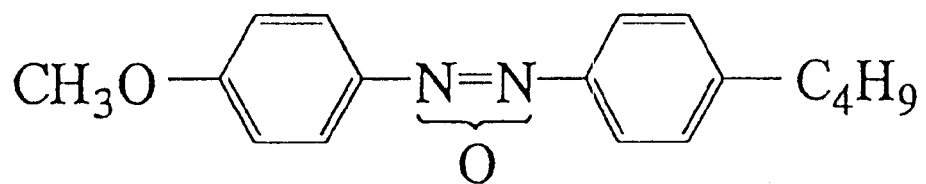
Figure 26:
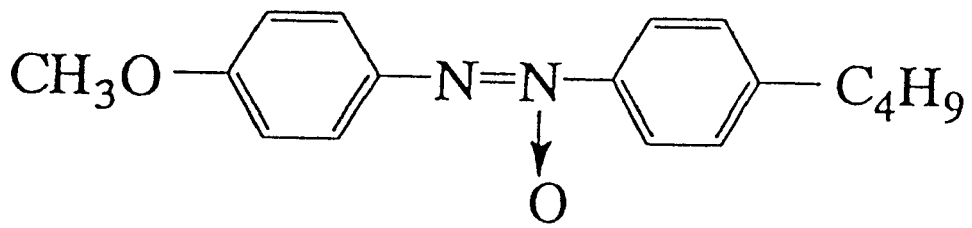
Figure 27:
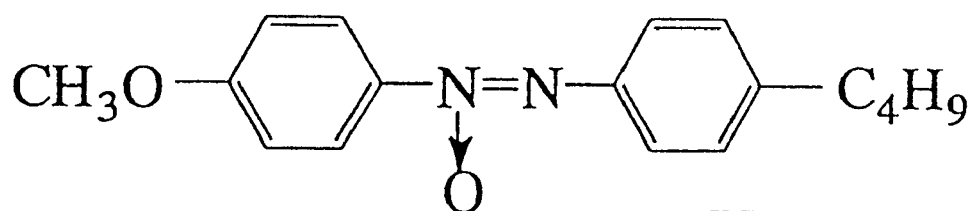
Figure 28:
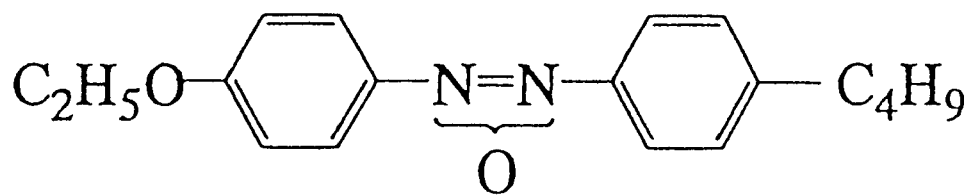
Figure 29:
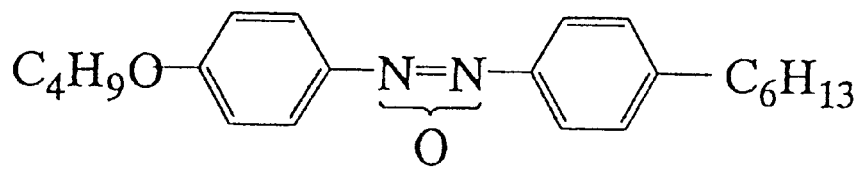
Figure 30:
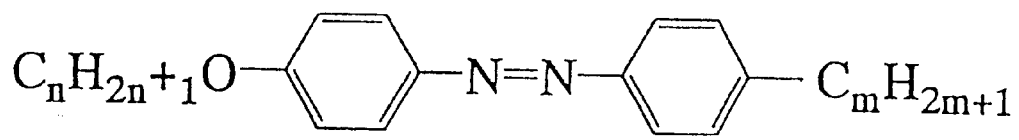
Figure 31:
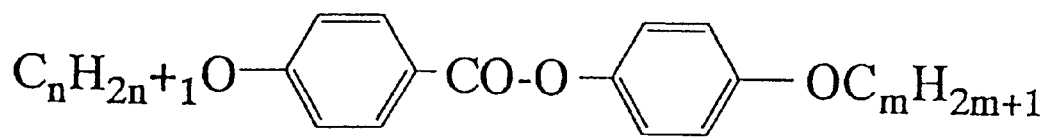
Figure 32:
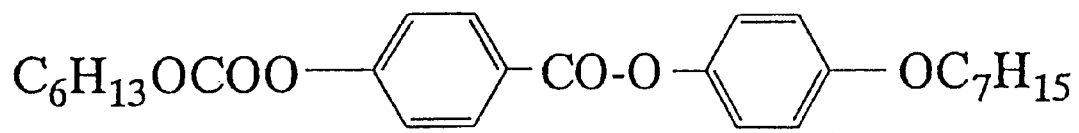
Figure 33:
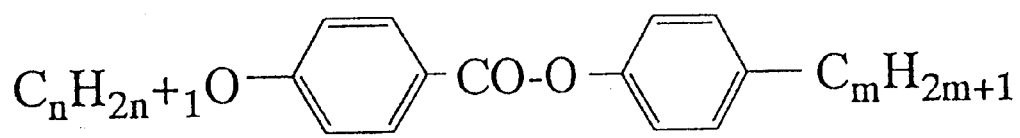
Figure 34:
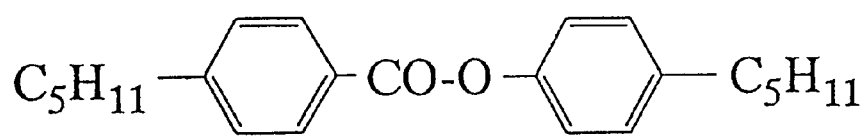
Figure 35:
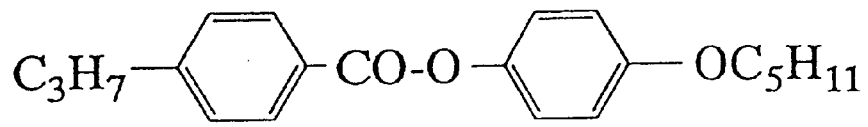
Figure 36:
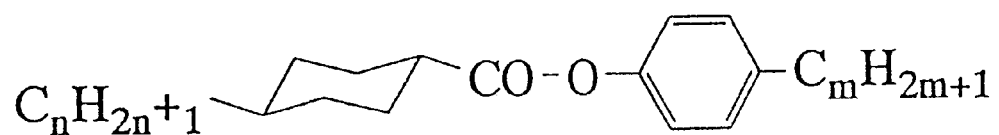
Figure 37:
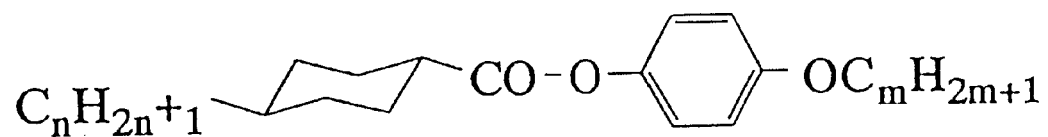
Figure 38:
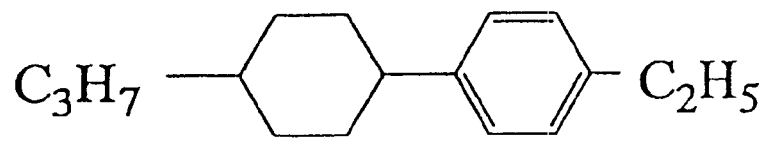
Figure 39:
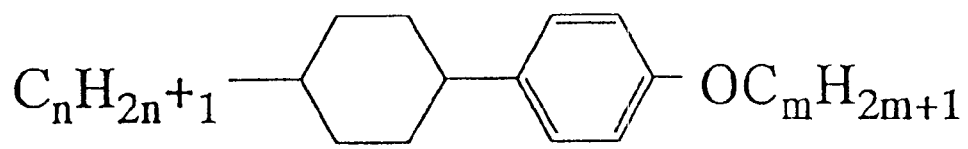
Figure 40:
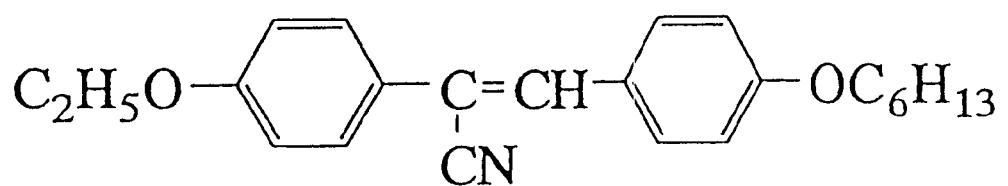
Figure 41:
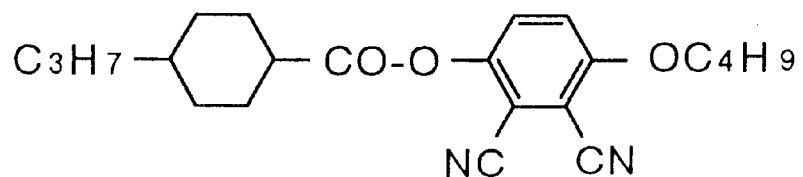
Figure 65:
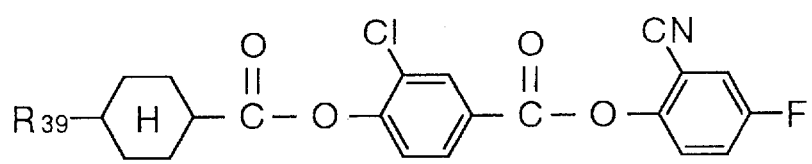

The liquid crystalline substances whose chemical formulas are given in FIGS. 8 through 65 may be used as the liquid crystalline substance. In these figures, n and m each represents an integer from 1 to 17. While the liquid crystalline substances whose chemical formulas are given in FIGS. 8 through 65 are low-molecular weight substances, the liquid crystalline substances which can be used in the present invention are not limited to low-molecular weight substances.

Figure 42:
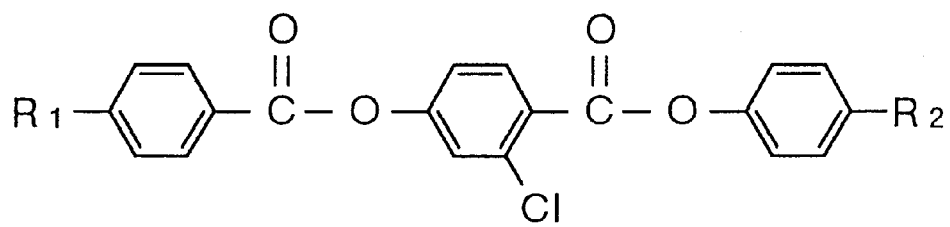

In FIG. 42, $R_1$ represents a $C_1$ to $C_{17}$ alkyl group and $R_2$ represents a $C_1$ to $C_{17}$ alkyl group.

Figure 43:
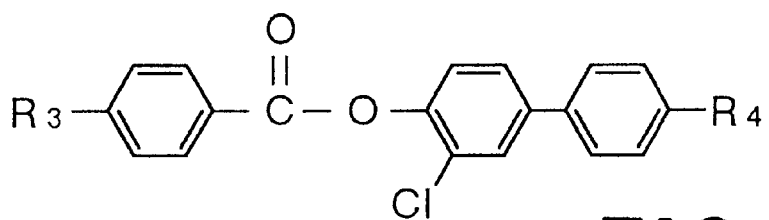

In FIG. 43, $R_3$ represents a $C_1$ to $C_{17}$ alkyl group and $R_4$ represent $C_1$ to $C_{17}$ alkyl group.

Figure 44:
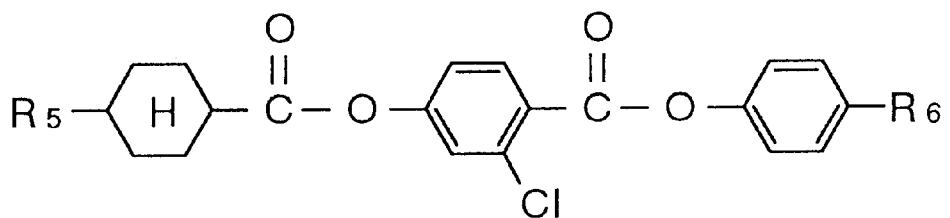

In FIG. 44, $R_5$ represents a $C_1$ to $C_{17}$ alkyl group and $R_6$ represents a $C_1$ to $C_{17}$ alkyl group.

Figure 45:
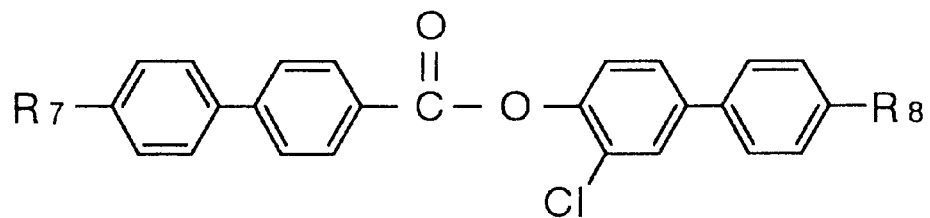

In FIG. 45, $R_7$ represents a $C_1$ to $C_{17}$ alkyl group and $R_8$ represents a $C_1$ to $C_{17}$ alkyl group.

Figure 46:
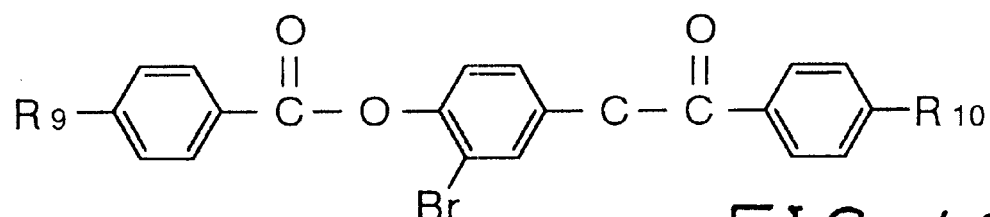

In FIG. 46, $R_9$ represents a $C_1$ to $C_{17}$ alkyl group and $R_{10}$ represents a $C_1$ to $C_{17}$ alkyl group.

Figure 47:
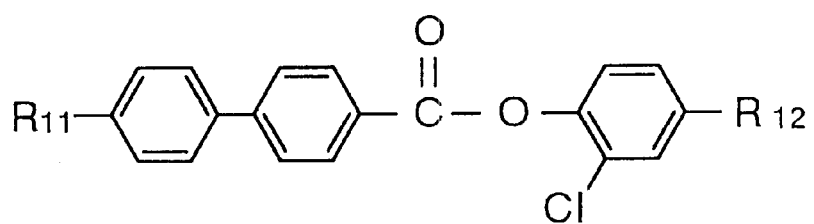

In FIG. 47, $R_{11}$ represents a $C_1$ to $C_{17}$ alkyl group and $R_{12}$ represents a $C_1$ to $C_{17}$ alkyl group.

Figure 48:
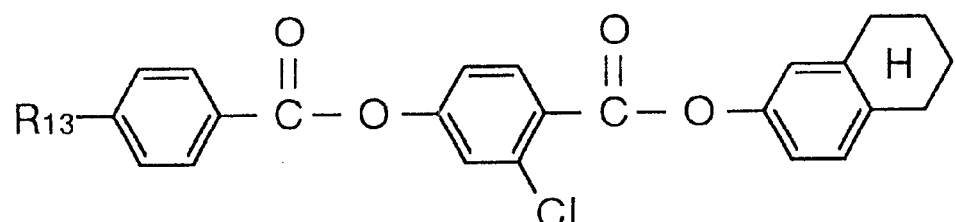
Figure 49:
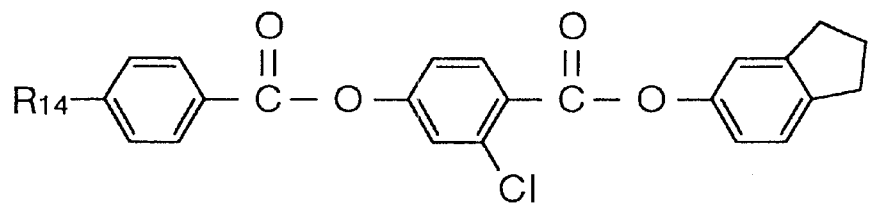
Figure 50:
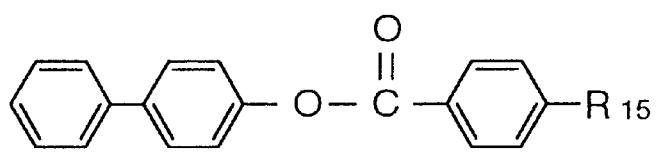
Figure 51:
Figure 52:
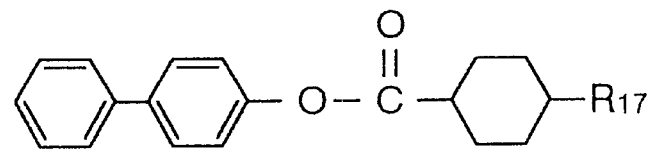
Figure 53:
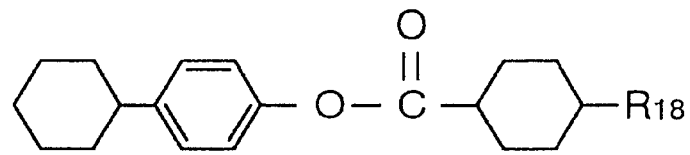

In FIG. 48, $R_{13}$ represents a $C_1$ to $C_{17}$ alkyl group.
In FIG. 49, $R_{14}$ represents a $C_1$ to $C_{17}$ alkyl group.
In FIG. 50, $R_{15}$ represents a $C_1$ to $C_{17}$ alkyl group.
In FIG. 51, $R_{16}$ represents a $C_1$ to $C_{17}$ alkyl group.
In FIG. 52, $R_{17}$ represents a $C_1$ to $C_{17}$ alkyl group.
In FIG. 53, $R_{18}$ represents a $C_1$ to $C_{17}$ alkyl group.

Figure 54:
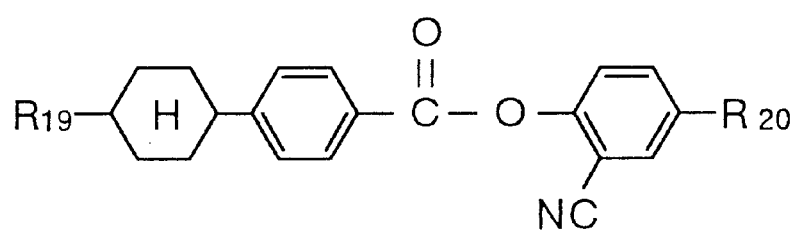

In FIG. 54, $R_{19}$ represents a $C_1$ to $C_{17}$ alkyl group and $R_{20}$ represents a $C_1$ to $C_{17}$ alkyl group.

Figure 55:
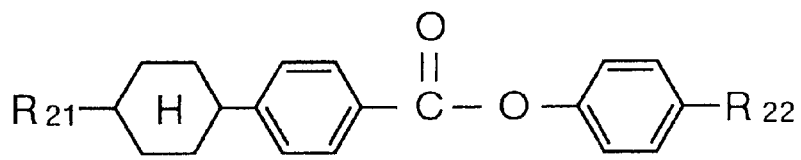

In FIG. 55, $R_{21}$ represents a $C_1$ to $C_{17}$ alkyl group and $R_{22}$ represents a $C_1$ to $C_{17}$ alkyl group.

Figure 56:
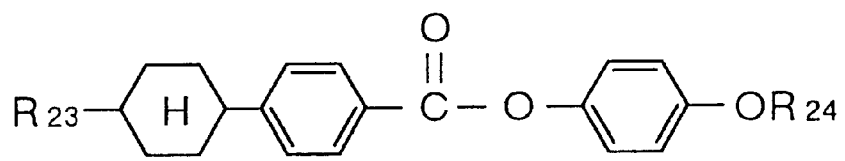

In FIG. 56, $R_{23}$ represents a $C_1$ to $C_{17}$ alkyl group and $R_{24}$ represents a $C_1$ to $C_{17}$ alkyl group.

Figure 57:
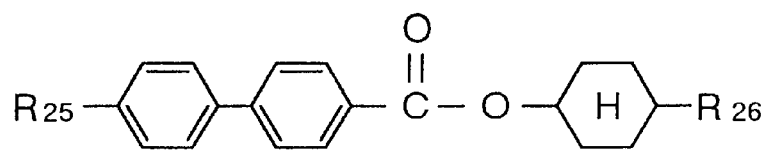

In FIG. 57, $R_{25}$ represents a $C_1$ to $C_{17}$ alkyl group and $R_{26}$ represents a $C_1$ to $C_{17}$ alkyl group.

Figure 58:
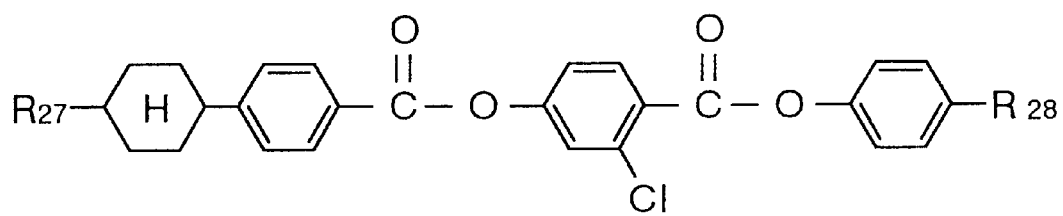

In FIG. 58, $R_{27}$ represents a $C_1$ to $C_{17}$ alkyl group and $R_{28}$ represents a $C_1$ to $C_{17}$ alkyl group.

Figure 59:
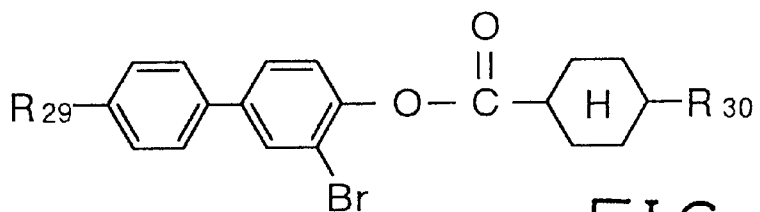

In FIG. 59, $R_{29}$ represents a $C_1$ to $C_{17}$ alkyl group and $R_{30}$ represents a $C_1$ to $C_{17}$ alkyl group.

Figure 60:
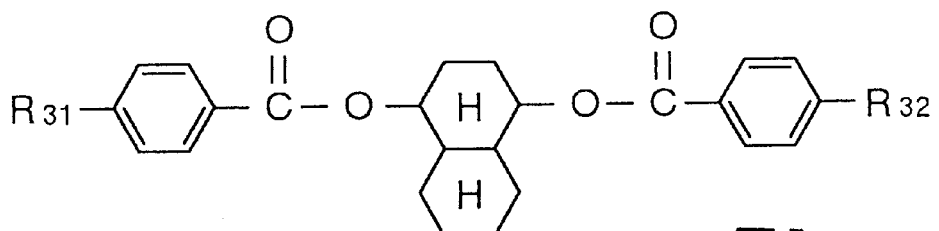

In FIG. 60, $R_{31}$ represents a $C_1$ to $C_{17}$ alkyl group and $R_{32}$ represents a $C_1$ to $C_{17}$ alkyl group.

Figure 61:
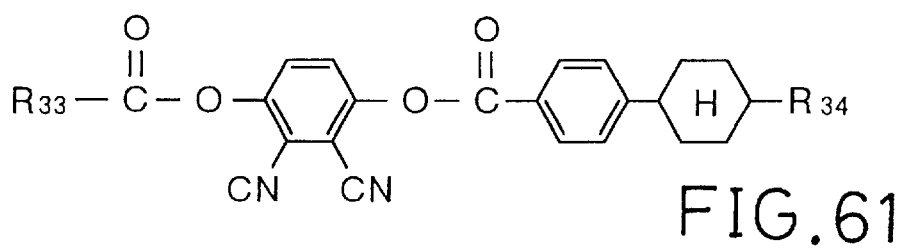

In FIG. 61, $R_{33}$ represents a $C_1$ to $C_{17}$ alkyl group and $R_{34}$ represents a $C_1$ to $C_{17}$ alkyl group.

Figure 62:
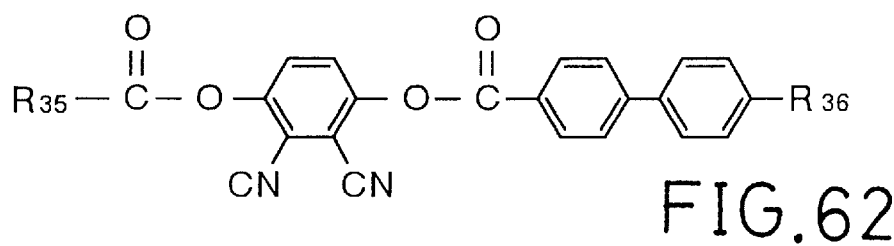

In FIG. 62, $R_{35}$ represents a $C_1$ to $C_{17}$ alkyl group and $R_{36}$ represents a $C_1$ to $C_{17}$ alkyl group.

Figure 63:
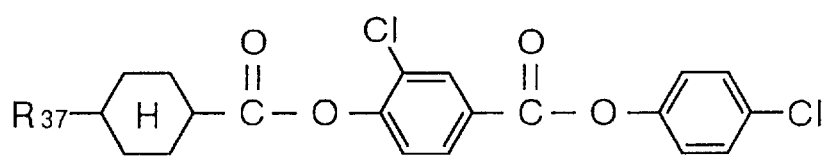
Figure 64:
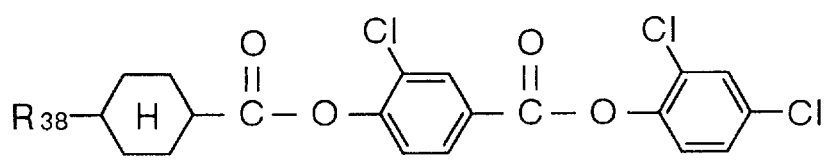

In FIG. 63, $R_{37}$ represents a $C_1$ to $C_{17}$ alkyl group.
In FIG. 64, $R_{38}$ represents a $C_1$ to $C_{17}$ alkyl group.
In FIG. 65, $R_{39}$ represents a $C_1$ to $C_{17}$ alkyl group.

Orientation-Sustaining Material

The orientation-sustaining material is a component that is capable of sustaining the state of molecular orientation of the liquid crystal in the absence of an external stimulus. "External stimulus" here refers to an electrical field, magnetic field, heat, deformation induced by stress, or the like. When a liquid crystal composition which contains this type of orientation-sustaining material is used, the liquid crystal molecules can be oriented in the field direction through, for example, the application of an electric field of a frequency such that positive dielectric anisotropy is exhibited, and a transparent state is brought about thereby. The orientation-sustaining material sustains the state of molecular orientation that produces a transparent state even after voltage has ceased to be applied. When transformation from orientational ordering that produces a transparent state to an orientation that produces a light scattering state is brought about through the action of external force, the transformed orientation is sustained continuously by the orientation-sustaining material even after the external force is no longer applied, even in the absence of any applied voltage.

Examples of the orientation-sustaining material are the polymeric materials and flat particles described below. These orientation-sustaining materials are used to form a composite with the liquid crystalline substance.

Liquid Crystal/Polymer Composite

One example of an orientation-sustaining material is a polymeric material that is transparent, that is combined with a liquid crystalline substance such that the liquid crystal forms a continuous phase or a discontinuous phase, and that has functional groups which are capable of restricting liquid crystal molecular orientation and of sustaining their state of orientation. This polymeric material itself must be transparent. In addition, it is preferable for its refractive index to coincide with the ordinary light refractive index of the liquid crystalline substance. It is necessary for the polymeric material to be combined with a liquid crystalline substance so that a uniform display can be maintained in response to induced deformation in any area of the liquid crystal composition. The polymeric material is combined with a liquid crystalline substance that forms a continuous phase or a discontinuous phase.

The formation of a "continuous phase" by the liquid crystalline substance in the liquid crystal composition refers to a state in which the polymeric material is dispersed in the form of a three-dimensional network, and the liquid crystalline substance is present in the open cells of the network structure (i.e., a so-called PNLC type). It also includes states in which a polymeric material of particle or thin plate form is dispersed throughout a liquid crystalline substance. The size and shape of the cells formed by the polymeric material can be selected as appropriate. The size is generally 0.05 $\mu$m to 10 $\mu$m, preferably 0.1 $\mu$m to 5 $\mu$m, and ideally 0.5 $\mu$m to 5 $\mu$m. Light scattering during display is maximized when the cell size is roughly equivalent to the visible light wavelengths. If the cell size is too large, the light scattering effect is weakened; if it is too small, transparency in the transparent state is adversely affected, or excessively high voltage is required to erase the display.

The use of a liquid crystal composition employing a polymeric material within which the liquid crystalline substance forms a continuous phase allows the display to be erased with a lower threshold voltage than that required for a liquid crystal composition in which the liquid crystalline substance forms a discontinuous phase. It also offers a more rapid response time.

The formation of a "discontinuous phase" by the liquid crystalline substance in the liquid crystal composition refers to a state in which numerous liquid crystal domains are completely surrounded by the polymeric material. A specific example is a state in which the polymeric material has closed cells, and the liquid crystalline substance fills these cells (i.e., a so-called PDLC type). The size and shape of the cells formed by the polymeric material can be selected as appropriate. The size is generally 0.05 $\mu$m to 10 $\mu$m, preferably 0.1 $\mu$m to 5 $\mu$m, and ideally 0.5 $\mu$m to 5 $\mu$m. Light scattering during display is maximized when the cell size is roughly equivalent to the visible light wavelengths. If the cell size is too large, the light scattering effect is weakened; if it is too small, transparency in the transparent state is adversely affected, with the result that high voltage is required to erase the display.

Various generally known methods for forming composites of liquid crystalline substances and polymeric materials (such as microencapsulation of the liquid crystalline substance, evaporation of a solvent in which the liquid crystalline substance and the polymer have been dissolved, or cooling of a uniform liquid mixture of a liquid crystalline substance and a thermoplastic resin that has been heated and dissolved) may be used to form this kind of composite structure. Alternatively, a polymeric material of particle or flat plate form may be simply mixed with a liquid crystalline substance.

A suitable method for this embodiment is to subject a liquid mixture of a liquid crystalline substance and a monomer that is capable of being polymerized to give a polymeric material to ultraviolet irradiation, heat, or other stimulus to bring about polymerization of the monomer. Polymerization with ultraviolet light is particularly favorable. During polymerization, a crosslinking agent may be added in order to crosslink the polymer. Polymerization can also be conducted in the presence of a photopolymerization initiator, photosensitizer, or other additive, a reactive diluent, an organic solvent, and the like.

When the monomer polymerization process is used, the liquid crystalline substance can be induced to form a continuous phase or a discontinuous phase, as desired, through selection of the liquid crystalline substance and monomer proportions, although this depends to a certain extent on the particular combination of liquid crystalline substance and polymeric material type (polymer-forming monomer used as starting material) used. Generally, a large monomer proportion tends to form a PDLC type, while a small monomer proportion tends to form a PNLC type.

The proportion of the polymeric material in the liquid crystal/polymer composition is 5 to 95 wt %, and preferably 5 to 80 wt %. Further, preferred values are 10 to 80 wt %, and ideally 20 to 80 wt %. If the proportion of the polymeric material is too large or too small, the light scattering effect is diminished. Also, when the proportion of the polymeric material is too large, a high voltage is required to erase the display. The polymeric material has functional groups which restrict orientation of the liquid crystal molecules so that the state of liquid crystal molecular orientation can be sustained. More specifically, it contains functional groups which restrict orientation of the liquid crystal molecules so that the liquid crystal molecules do not become reoriented in the absence of an external stimulus. Types of polymeric materials containing such functional groups include those consisting of a monomer that has functional groups or containing a monomer that has functional groups so that the functional groups constitute a portion of the polymeric material, and those in which a compound containing functional groups is uniformly mixed throughout the polymeric material.

Examples of functional groups suitably provided to the polymeric material are hydroxyl groups, amide groups, amino groups, urea groups, urethane groups, carboxyl groups, phenolic groups, and other such functional groups.

Where functional groups are to be introduced into the polymeric material through polymerization of a monomer, the monomer can be a photo- or thermal-polymerizable monofunctional monomer having a double bond, a polyfunctional monomer with two or more double bonds, or the like. The monomer can contain one or more of the functional groups; when two or more functional groups are contained, these functional groups may be the same or different. Specific examples are 2-hydroxyethyl (meth)acrylate, 1- or 2-hydroxypropyl (meth)acrylate, 1- or 2-hydroxybutyl (meth)acrylate, 1,4-butanediol mono(meth)acrylate, 1,6-hexanediol mono(meth)acrylate, glycerol mono(meth)acrylate, 2-aminoethyl (meth)acrylate, (meth)acrylamide, monoalkyl (meth)acrylamide, monoalkyl (meth)acrylamide, (meth)acrylic acid, 4-hydroxybenzyl (meth)acrylate, Kayarad R-167, Kayarad PET-128, and Kayarad R-128H (the foregoing three products manufactured by Nihon Kayaku Co.)

The proportion of the monomer containing the functional group in the polymeric material is 5 wt % to 100 wt %, preferably 20 wt % to 100 wt %, and ideally 40 wt % to 100 wt %. If the proportion of the functional group-containing monomer is too small, transparency in the transparent state is adversely affected in some cases. Examples of copolymerizable monomers and crosslinking agents are methyl (meth)acrylate, ethyl (meth)acrylate, propyl (meth)acrylate, butyl (meth)acrylate, hexyl (meth)acrylate, 1,4-butane di(meth)acrylate, 1,6-hexyl di(meth)acrylate, polyethylene di(meth)acrylate, polypropylene di(meth)acrylate, Kayarad HX-620, Kayarad HX-220, Kayarad R-684, Kayarad TMPTA, Kayarad GPO-303, Kayarad R-551, and Kayarad R-712(the foregoing seven products manufactured by Nihon Kayaku Co.). The mechanical strength of the polymeric material can be enhanced by adding a crosslinking agent.

Photopolymerization initiators include 2-hydroxy-2-methyl-1-phenoxypropan-1-one, and benzyldimethylketal.

The liquid crystalline substance which is combined with the polymeric material is preferably a liquid crystalline substance having positive dielectric anisotropy at some given frequency. Such a liquid crystalline substance can be used to form a light scattering liquid crystal that can be used to construct a bright display, obviating the need for a polarizer and oriented film.

FIG. 1 depicts an example of a design which employs a liquid crystal/polymer composite 8 comprising a liquid crystal 10 which has positive dielectric anisotropy at some frequency and a polymeric material 11 that has a network structure within which the liquid crystal 10 forms a continuous phase. The composite is used as the liquid crystal composition, and is packed between a transparent substrate 4 capable of elastic deformation and another substrate 6. FIG. 1 depicts a liquid crystal cell 2 in cross section.

As shown in (a), when an electric field of a frequency that produces positive dielectric anisotropy is applied, the liquid crystal 10 orients and becomes aligned parallel to the field direction, resulting in a transparent state. Absent any external stimulus, this state persists even after the electric field ceases to be applied. When external force is applied to the substrate 4 in the absence of an applied field, the substrate 4 deforms in the manner depicted in (b), and the molecular orientation of the liquid crystal 10 in the corresponding area becomes disordered. As a result, this area becomes light scattering, producing optical contrast with the transparent area. At this time, the functional groups of the polymeric material 11 restrict the reorientation of the liquid crystal molecules so that the disordered molecular orientation is sustained even after the external force is no longer applied. That is, even though the deformation of the substrate 4 recovers, the functional groups act to sustain the molecular orientation of the liquid crystal 10 in the state of molecular orientation produced by the action of the external force. As a result, a state of contrast with the area not subjected to external force (transparent area) is sustained (see (c)). When an electric field of a frequency producing positive dielectric anisotropy is subsequently applied, the liquid crystal 10 orients in parallel to the field direction and the display is erased, resuming a transparent state (see (a)).

In FIG. 1, a liquid crystal/polymer composite 8 in which the liquid crystal forms a continuous phase was described, but similar effect is seen with a liquid crystal/polymer composite in which the liquid crystal forms a discontinuous phase.

Liquid Crystal/Flat Particle Composite

A "flat" particle refers to one with a particle aspect ratio exceeding a certain value. In general, the aspect ratio should be at least 2, and preferably at least 5. The particle shape is not limited to plate form; rods and needles are satisfactory as well. The flat particles efficiently form liquid crystal domains within the liquid crystal composition.

There are no restrictions regarding the material which constitutes the flat particles. Affinity is required of the particles, but this affinity may be conferred through material treatment. The material need not be transparent. Where flat particles capable of self-induced orientational changes in the presence of an electric field are used, the distinct and rapid orientational changes afford a more rapid response time and lower threshold voltage required to erase the display.

Favorable examples of flat particles capable of self-induced orientational changes in the presence of an electric field are layered clay minerals, titanium oxide, alumina white (water-insoluble basic aluminum sulfate), calcium carbonate, zinc oxide plates, scaly aluminum powder, Prussian blue, hematite oxide, various type of ceramics in plate crystal form, graphite, and the like. Crystalline organic materials and metal complexes of organic materials may be used as well. Particles that do not undergo self-induced orientational changes in the presence of an electric field may be used in the present invention as well. Examples of particles with low or virtually no field response are particles of polyethylene, polypropylene, polytetrafluoroethylene, and other organic polymers.

In order to ensure that the response speed of the liquid crystal composition is equal to the response speed of the liquid crystal itself, it is preferable for the flat particles to interact with the liquid crystal molecules solely through interface so that the internal viscosity of the liquid crystal is not affected.

In light of the foregoing requirement, layered clay minerals are the best material for the flat particles. Examples of layered clay minerals are natural or synthetic montmorillonite, saponite, mica, and hectorite. From the standpoint of relative ease of dispersion throughout the liquid crystal, montmorillonite is particularly typical. The layered organosilicon polymer disclosed in Japanese Patent Application 4-360551 (Japanese Laid-Open Patent Application 6-200034 ) is particularly favorable as the flat particles. The layered organosilicon polymer referred to here is a crystalline polymer consisting of a layered structure comprising tetrahedron sheets having silicon or metal as the central atoms and octahedron sheets having metal as the central atoms. In this layered organosilicon polymer, some or all of the silicon or metal central atoms of the tetrahedron sheets are bonded with organic groups by covalent bonds. In the following discussion "layered clay minerals, etc." refers to layered clay minerals and to this layered organosilicon polymer.

The particle size of the flat particles (particle size here refers to the maximum length of the particle) is ideally about 0.1 to 20 $\mu$m. If the particle size is below this range, it becomes impossible to effectively form liquid crystal domains, and it becomes impossible to effectively sustain the state of orientation through particle affinity. If the particle size is above this range, the nonuniformity of the liquid crystal composition will stand out when it is used to fabricate light adjusting materials and devices employing these, with the result that appearance is adversely affected. There is also the risk that adequate orientation will become impossible due to physical constraints when used for the fabrication of cells in a device having a cell gap of several dozen $\mu$m. The particle size range 0.2 to 5 $\mu$m is particularly favorable. Layered clay minerals, etc., can readily be manufactured within these optimal particle size ranges.

The flat particles should be dispersed densely enough to effectively form liquid crystal domains. However, flat particle density must not be too high, or the particles will tend to constrict each other's change in orientation. The density by which these two requirements may be fulfilled will differ depending on liquid crystal type, flat particle type and size, and other factors, and a single rule cannot be specified. However, in general, it is favorable to disperse the flat particles in an amount of 1 to 10 parts by weight per 100 parts by weight liquid crystal. This range applies when the flat particles are layered clay minerals, etc., as well.

With regard to the state of dispersion of the flat particles within the liquid crystalline substance, it is not always necessary for individual particles to be completely dispersed. Some of the particles may form agglomerations of several or several dozen particles; it is sufficient simply for the particles to be dispersed to the extent that the actions and effects of the flat particles are exhibited. For example, layered clay minerals, etc., when dispersed in a liquid crystalline substance, sometimes in part take the form of several dozen overlapping particle clusters (monolayers); nonetheless, the actions and effects of the flat particles are adequately exhibited.

In order for the particles to sustain the state of molecular orientation of the liquid crystal, they must have affinity with the liquid crystal. Where the flat particles consist of a material that has inherent affinity for liquid crystalline substances, such as some crystalline organic compounds and metal complexes of organic compounds, the material may be used without further modification. Where the flat particles consist of a material that does not have inherent affinity for liquid crystalline substances, such as inorganic compounds including layered clay minerals, etc., some treatment for imparting affinity for liquid crystalline substances is required. Examples of such treatments are inducing the particle surface to adsorb or bond with an organic compound.

Particularly where a layered clay mineral is used for the flat particles, ion exchange is effective for endowing the material with affinity for liquid crystalline substances. Specifically, since alkali metal ions are present between layers in layered clay minerals, affinity for liquid crystalline substances can be conferred by conducting ion exchange with organic onium ions or with onium ions with liquid crystal groups (so-called organic transformation).

As for the types of onium ions. The optimal type may be selected in accordance with the type of liquid crystal molecule which is to be used, considering the affinity therefor. Alkyl ammonium ions and the like are typical. Suitable selection of organic onium ions allows various characteristics of layered clay minerals, such as surface properties, electrical and optical properties, dispersion, and field response to be controlled.

When preparing a composition of the liquid crystalline substance and flat particles having affinity therefor, it is sufficient simply to mix the two. However, a more uniform mixture can be produced by uniformly mixing the two using a common solvent, and then removing the common solvent by some appropriate means. The same holds true in the preparation of compositions of a liquid crystalline substance and layered clay minerals, etc.

The liquid crystalline substance which is mixed with the flat particles is preferably one having positive dielectric anisotropy at some frequency. The use of such a liquid crystalline substance makes it possible to prepare a light scattering liquid crystal which can be used for a bright display, obviating the need for a polarizer or oriented film.

Figure 2B:
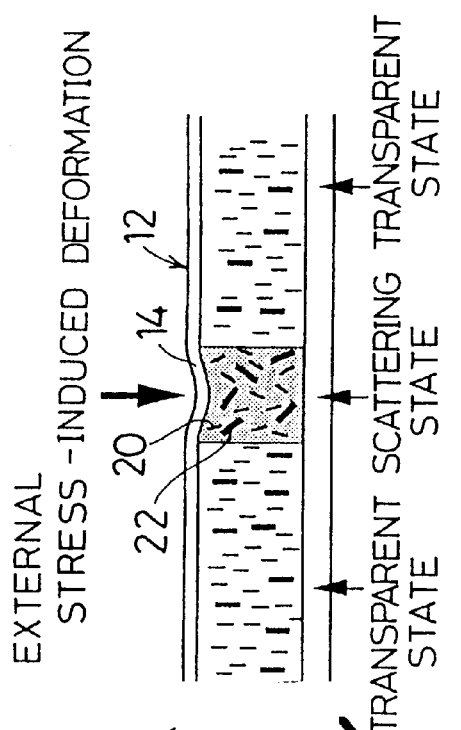
Figure 2C:
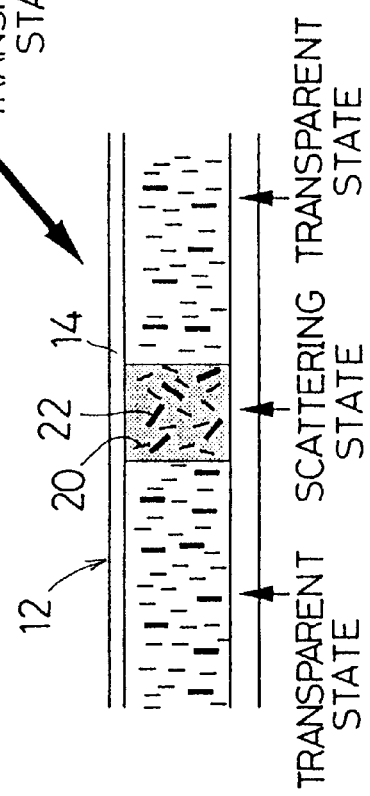

FIG. 2 depicts an example of the cross section of a liquid crystal cell 12 employing a liquid crystal/flat particle composite 18. The cell comprises a transparent substrate 14 which is capable of elastic deformation, another substrate 16, and a liquid crystal composition consisting of a liquid crystalline substance 20 having positive dielectric anisotropy at some frequency and flat particles 22 having affinity therefor and dispersed within the liquid crystalline substance.

As shown in (a), when an electric field of a frequency that produces positive dielectric anisotropy is applied, the liquid crystal 20 orients and becomes aligned parallel to the field direction. In addition, the flat particles 22 become oriented parallel to the field direction together with the liquid crystal molecules, due to their affinity for the liquid crystal molecules 20. Thus, the cell 12 assumes a transparent state. Absent any external stimulus, this state persists even after the electric field ceases to be applied. When external force is applied to the substrate 14 after halting application of the field, the substrate 14 deforms in the manner depicted in (b), and the molecular orientation of the liquid crystal 20 and the orientation of the flat particles 22 in the corresponding area become disordered. As a result, this area becomes light scattering, producing optical contrast with the transparent area. At this time, the affinity of the flat particles 22 serves to restrict reorientation of liquid crystal 20 so that its disordered orientation is sustained together with that of the flat particles 22. Even though the deformation of the substrate 14 subsequently recovers, the flat particles 22 and the liquid crystal 20 are sustained in the state of orientation produced by the action of the external force. As a result, contrast with the area not subjected to external force (transparent area) is sustained (see (c)). When an electric field that produces positive dielectric anisotropy is subsequently applied, the liquid crystal 20 and the flat particles 22 become oriented in the field direction and the display is erased, resuming a transparent state (see (a)).

Substrate

Of the pair of substrates which constitute the liquid crystal display element, at least one of the substrates must be transparent, and at least one of them must be capable of elastic deformation. However, the particular combination may be freely chosen. A substrate which is both transparent and capable of elastic deformation may be used on one side, or one substrate may be transparent, with the other being capable of elastic deformation. "Capable of elastic deformation" refers to the ability to be depressed by the application of external force, and to subsequently recover.

Examples of materials which are transparent and capable of elastic deformation are PET films, acrylic films, and other transparent resin films, and polyisoprene and other rubber films. Examples of materials which are transparent but not elastic are glass, PET sheeting, acrylic sheeting, polystyrene sheeting, and other transparent resin sheeting. Examples of materials that are capable of elastic deformation but not transparent are polypropylene, polyethylene, nylon, and other crystalline resin films; resins and rubber films containing carbon black and the like. The efficiency of reflection may be enhanced through deposition of aluminum or the like, or through application of a metal foil such as aluminum foil.

The surface of the substrate capable of elastic deformation may be provided with a hard coating or the like in order to prevent scratching, as long as input is not impaired.

Transparent electrodes include indium tin oxide (ITO) and the like. Non-transparent electrodes include those of common conducting materials such as iron, copper, chromium, gold, and silver. These electrodes may be used as substrates. Alternatively, electrodes may be patterned in various ways.

Spacer

The use of spacers in order to define the gap between the substrates and to support the substrate so that substrate deformation does not extend to areas other than the writing area is preferred. With the liquid crystal composition which pertains to the present invention, the use of a prescribed quantity of spacers is necessary when the liquid crystal/fine particle composite exhibits overall fluidity. Examples of spacers are polystyrene or glass beads and other spherical particles, and polymer films with prescribed holes made in them. The quantity of beads will differ depending on whether a liquid crystal/polymer composite or a liquid crystal/fine particle composite is used as the liquid crystal composition. In the case of a liquid crystal/polymer composite, a suitable quantity is 1 to 500 beads per 1 $mm^2$; in the case of a liquid crystal/fine particle composite, 50 to 500 beads per 1 $mm^2$ is suitable. The bead size will depend on the cell gap; approximately 2 to 50 $\mu$m is favorable for achieving a balanced contrast of liquid crystal display elements. 5 to 30 $\mu$m is more favorable.

When a polymer film is used, the occupied area should not exceed 90%, and the configuration should be such that all portions of the display element are supported efficiently. An example of such a configuration is a film with a honeycomb structure. The honeycomb cell size is favorably about 20 to 500 $\mu$m. The honeycomb wall thickness is preferably about ⅕ to ¹⁄₁₀₀ of the cell size. Of course, the shape of the cell is not limited to a honeycomb; circular or polygonal forms may be used as well. As in the case of beads, the film thickness should preferably be about 2 to 50 $\mu$m.

Sealing Agent

The periphery of the liquid crystal display cell should preferably be sealed with a sealing agent or the like in order to maintain mechanical strength of the cell and prevent oxidative deterioration of the liquid crystal. There are no particular restrictions regarding the sealing agent. Typical products such as epoxy sealing agents or acrylic sealing agents may be used.

Input Means

The means used for deforming the substrate can be any means capable of deforming the elastically deformable substrate which constitutes the cell, and of disordering the orientation of liquid crystal molecules or of flat particle orientation as well. Examples are written input, such as with fingertip or pen, standardized input, such as with a typewriter or stamp, or dot input, such as with a dot matrix printer.

Readout Means

Besides the obvious visual functionality, the proposed liquid crystal display can be optionally combined with generally known technologies so that written data can be read out electrically or optically.

(1) Electrical Readout Means

Figure 3:
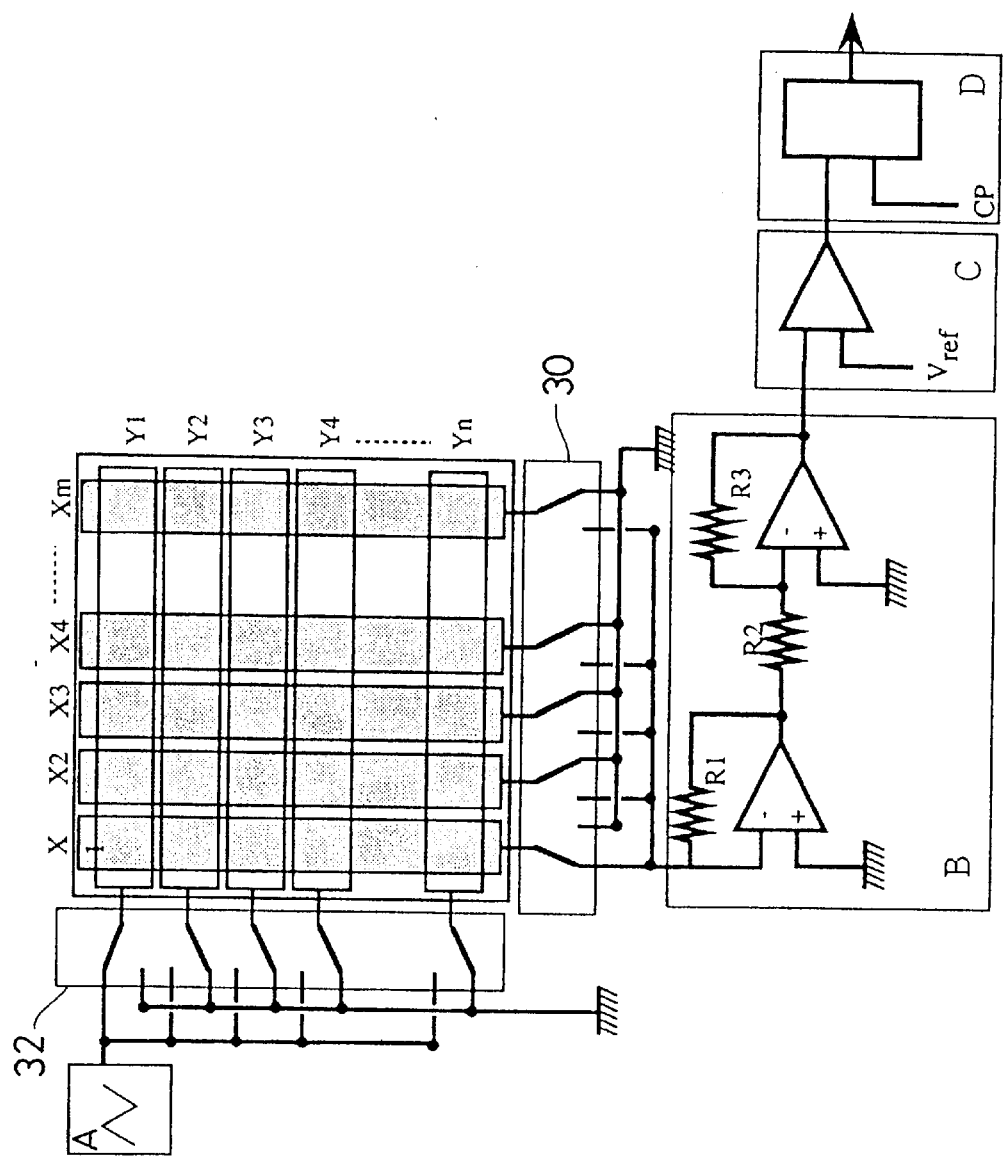
FIG. 3 is an illustration of the circuitry of an electrical readout device effective for use in the present invention.

The molecular orientation of the liquid crystal differs between the written state and the non-written state of the liquid crystal display element. Thus, the dielectric anisotropy of the liquid crystal molecules results in differences in capacity between the electrodes. By detecting these differences, it is possible to conduct electrical readout. By way of a specific example, it is possible to achieve electrical readout of the written state by substituting an X-Y electrode matrix for the solid electrode on the substrate, and measuring the electrical capacity of each pixel in the written state and the non-written state to electrically read out the written state. Various methods may be used to measure electrical capacity; the method described in Terebijon Gakkai Gijutsu Hokoku, Vol. 8, No,. 50 is one effective method. The readout circuit used in this method is depicted in FIG. 3. The circuit comprises m X electrodes X1 through Xm arrayed in parallel on one side; n Y electrodes Y1 through Yn arrayed on another side so as to be positioned orthogonal to the X electrodes X1 through Xm; X and Y switches 30 and 32 attached to the X and Y electrodes respectively for selecting pixels; a detection signal voltage oscillator circuit A provided to one side of the Y switch; a current/voltage conversion circuit B for converting the current flowing through each pixel into voltage; a comparator C for comparing a reference voltage with the detected voltage; and a latching circuit D for obtaining the results of the comparison.

Written data can be read out with this detection circuit by the following procedure. First, the Y switch 32 is switched in linear order so that a signal voltage for triangular wave detection (VR) of a given frequency is applied to the Y electrodes Y1 through Yn by the detection signal voltage oscillator circuit A. Here, a single Y electrode is selected; the unselected electrodes are grounded to prevent crosstalk. As indicated in equation (1), the detected current ($I_s$) which flows into the X electrodes X1 through Xm depending on the capacity of each pixel located on the selected Y electrode is proportional to pixel capacity (Cnm) only, since dVR/dt is constant. The X switch 30 is switched during the period that the selected Y electrode is read out so that the detected current for the X electrodes X1 through Xm is input to the current/voltage conversion circuit B, where it is converted to voltage. The comparator C then compares the value with a reference voltage which corresponds to the nonwritten state, and the results of the comparison are obtained by the latching circuit D according to the timing of a latching signal CP. This procedure allows the capacity of each pixel, that is, the written state, to be detected. The detection signal frequency is synchronized with the timing of the opening and closing of the X switch 30. By performing this operation in linear fashion for each of the Y electrodes Y1 through Yn, the written state of all of the pixels can be detected.

$$I_S = Cnm \cdot dVR/dt \quad (1)$$

By conducting preliminary measurements of the reference voltage of each pixel in the nonwritten state and storing this data in memory, providing the reference voltage of each pixel to the comparator C with the appropriate timing, and performing comparisons with these values, it is possible to accurately detect the written state. In other words, variable density produced by variations in pen pressure can be detected as the continuous changes in capacity, allowing written data in a gradation display to be read out as it is.

Increasing the number of X electrodes and Y electrodes allows more detailed written data to be read out. However, if too many electrodes are used, the readout process becomes excessively time consuming, and low capacity results in significant readout errors. The optimal number will depend on the element size, but for a 10-inch size, a suitable number is 500×720; of course, more or fewer may be used. Electrode types include transparent ITOs, as well as aluminum, chromium, and other metals.

Thus, the liquid crystal display element which pertains to the present invention affords an element whose written state can be read out electrically.

(2) Optical Readout Means

Optical readout means include so-called electronic copying and CCD camera photography, scanner readout, and other generally known external devices. Combinations of these means may be used as well. Thus, the liquid crystal display element which pertains to the present invention affords an element whose written state can be read out optically.

In the liquid crystal display element which pertains to this practical example, the state of disordered liquid crystal molecular orientation produced by an external force is sustained even after external force is no longer applied due to the presence of a second component within the liquid crystal composition. This allows writing to be performed by applying external force, and permits continuous display without the use of a separate display sustaining means.

Experimental examples will be given below in order to further illustrate the first embodiment.

Experimental Example 1

Figure 4:
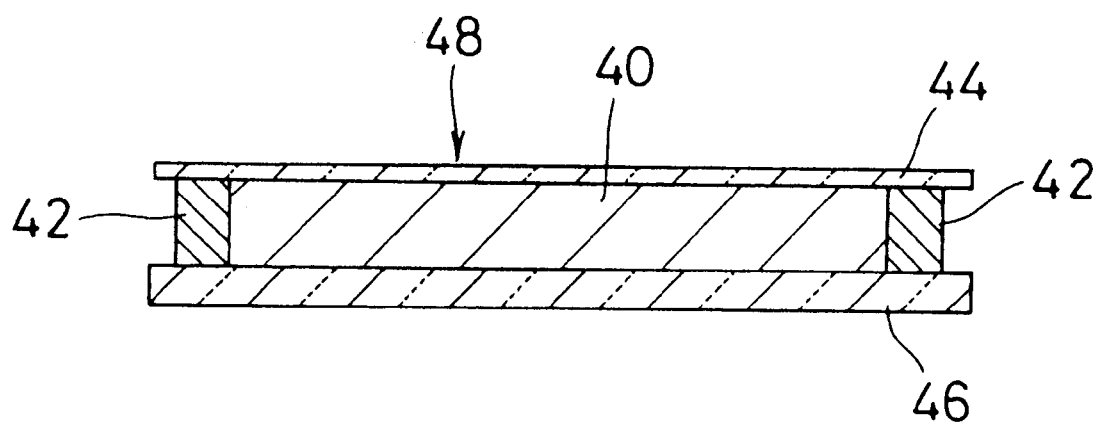
FIG. 4 is an illustration of the design of the cell manufactured in a first embodiment.

A mixture comprising 49 wt % liquid crystal (E70, manufactured by BDH), 34 wt % 2-hydroxyethyl methacrylate (manufactured by Wako Pure Chemical Industries), 15 wt % crosslinking agent (R167, manufactured by Nihon Kayaku) and 2 wt % photoinitiator (Irgacure 184 from Ciba-Geigy) was prepared. The mixture was sandwiched between an ITO-equipped PET film 44 and an ITO-equipped glass substrate 46, interposing 12 µm spacers 42. The assembly was irradiated with ultraviolet light (3.5 mW/cm$^2$) for 180 seconds to form a liquid crystal/polymer composite 40 between the substrates, yielding the display cell 48 depicted in FIG. 4.

Evaluation

Figure 5:
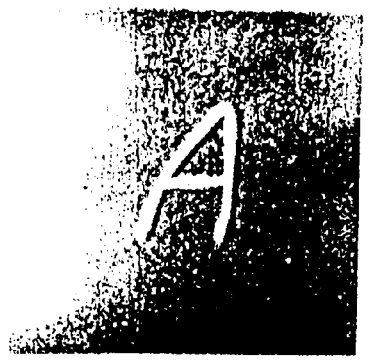
FIG. 5 is an illustration of the liquid crystal display element of the first embodiment when written upon.
Figure 6:
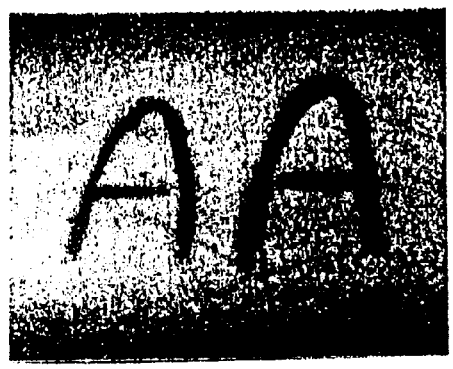
FIG. 6 is an illustration of the liquid crystal display element of the first embodiment when written upon, with the gradation display produced by differences in pen pressure shown on an OHP.
Figure 7:
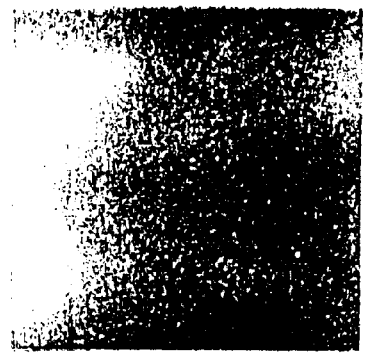
FIG. 7 is an illustration of the liquid crystal display element of the first embodiment with the display erased.

A plastic pen was used to input a character by deforming the prepared cell 48. FIG. 5 depicts the cell 48 after character input. FIG. 6 shows the cell 48 projected onto the wall using an OHP. The character on the right was written using strong pen pressure; the character on the left was written using weak pen pressure. It was possible to produce a gradation display using variable pen pressure. The displayed characters remained stable in memory for more than 150 days. It was possible to virtually completely erase written input by applying an 80 V/60 Hz electric field for 100 ms (see FIG. 7). In addition, by erasing the written input with a 20 V/60 Hz [field], it was possible to leave faint traces of the written input, which had the appearance of that written with weak pen pressure.

Experimental Example 2

97.3 wt % liquid crystal (E8+K15 (4:1), manufactured by BDH) and 2.7 wt % montmorillonite rendered organic with cyanobiphenyloxybutylammonium were mixed with and dispersed in N,N-dimethylacetamide. The solvent was distilled out from the mixture to prepare a liquid crystal/flat particle composite. This composite was sandwiched between an ITO-equipped PET film and an ITO-equipped glass substrate, interposing 12 µm spacers (density: 200/1 mm$^2$). The perimeter was sealed with an epoxy sealing agent to produce a display cell.

Evaluation

A plastic pen was used to input a character by deforming the prepared cell 48. The edges were somewhat fainter compared to those in Experimental Example 1. It was possible to produce a gradation display using variable pen pressure. The displayed characters remained stable in memory for more than 150 days. It was similarly possible to virtually completely erase written input by applying a 50 V/60 Hz electric field for 100 ms.

Experimental Example 3

The procedure of Practical Example 1 was followed, with the exception that an ITO-equipped glass substrate and an ITO-equipped PET film with patterned electrodes like those depicted in FIG. 3 were used, to produce a display cell (10-inch size; 500×720). The elements were combined with a circuit comprising X and Y switches respectively attached to the X and Y electrodes for selecting pixels, a detection signal voltage oscillator circuit A provided to one side of the Y switch, a current/voltage conversion circuit B for converting the current flowing through each pixel into voltage, a comparator C for comparing a reference voltage with the detected voltage, and a latching circuit D for obtaining the results of the comparison. The latch detection data was delivered to a personal computer via an interface circuit.

Evaluation

It was possible to read out written data including gradation display, as well as to display the data on the personal computer.

Experimental Example 4

A cell was manufactured as in Practical Example 1, with the exception that aluminum was deposited on the glass substrate 46 and a mirror surface electrode was produced. Readout with good contrast proved possible when written data was read out by electronic copier, scanner, and CCD.

Second Embodiment

An embodiment in which both writing and erasure can be controlled by electrical signals using a two-frequency-driving liquid crystalline substance will now be described.

Nematic and cholesteric two-frequency-driving liquid crystalline substances are favorable due to their good electric field response; smectic liquid crystals can also be used as long as they exhibit the prescribed electric field response. A single type of liquid crystalline substance may be used alone, or a mixture of two or more types of liquid crystalline substance may be used. It is generally favorable to use a liquid crystal mixture in order to produce a liquid crystal which fulfills various requirements.

There are no particular restrictions as for the molecular weight of the two-frequency-driving liquid crystalline substance; however, a low molecular weight is favorable because it results in rapid electric field response, and hence a low threshold voltage for achieving electric field response. "Low molecular weight" differs depending on the particular chemical structure of the liquid crystal molecule, but here refers, for example, to a molecular weight of 1,000 or lower.

Examples of liquid crystal molecules are those whose chemical formulas are given in FIGS. 41 through 65. The liquid crystalline substances which can be used in the present invention are not limited to those given in FIGS. 41 through 65, nor to low-molecular weight substances.

Various generally known methods may be used to form liquid crystal cells which employ a liquid crystal/polymer composite consisting of such a two-frequency-driving liquid crystalline substance and a polymeric material. For example, a uniform mixture of the two-frequency-driving liquid crystalline substance and a monomer capable of being polymerized to give a polymeric material can be sandwiched between electrodes (at least one of which is transparent), and, while maintaining a constant electrode gap through the use of spacers, subjected to ultraviolet light, an electron beam, heat, or the like to polymerize the monomer and form a composite between the electrode substrates, yielding a composite cell. Alternatively, the composition may be coated onto one of the electrode substrates, the monomer polymerized by subjecting it to ultraviolet light, an electron beam, heat, or the like, and the other electrode substrate then laminated thereto to produce a composite cell.

When fabricating a liquid crystal cell, it is favorable to use spacers to produce a uniform cell gap between the substrates. The cell gap is 2 $\mu$m to 100 $\mu$m, preferably 5 $\mu$m to 30 $\mu$m, and ideally 10 $\mu$m to 30 $\mu$m.

There are no particular restrictions regarding the electrode substrate, and any commonly used substrate may be employed. Examples are glass equipped with indium-tin oxide (ITO) [electrodes].

With light scattering liquid crystalline substances employing the composite which pertains to this embodiment, it is sufficient to apply the electric field only when switching between a transparent state and a light scattering state; light transmission can be readily controlled; and the need to continuously apply an electric field in order to hold a state in memory is obviated. Thus, power consumption can be reduced, deterioration of the liquid crystal can be prevented, and liquid crystal life can be extended. Since light transmission can be changed through the application of an electric field, the speed of switching response can be improved. Furthermore, this practical example affords a two-frequency-driving liquid crystalline substance endowed with memory, which is an achievement which would not be readily apparent to one skilled in the art.

The liquid crystal/polymer composite of this embodiment affords a product which possesses the characteristics of a two-frequency-driving liquid crystalline substance, that is, the ability to assume a different state of liquid crystal molecular orientation with respect to field direction depending upon the driving frequency, and thus affords ease of switching between a transparent state and a light scattering state without the use of special means. By utilizing functional groups selected for their ability to restrict changes in liquid crystal molecular orientation after application of an electric field has ceased, the state of orientation prevailing prior to halting application of the electric field can be sustained even after application of the electric field has ceased, and a transparent state or light scattering state can be held in memory.

With the method for controlling light transmission of this practical example, where a transparent state and a light scattering state are produced under different signs of the dielectric anisotropy of the two-frequency-driving liquid crystalline substance, light transmission can be easily changed by means of the frequency of the electric field. In addition, after application of the field has ceased, the state prevailing prior to halting application of the field is memorized so that light transmission may be sustained.

Experimental Examples 5 and 6

Figure 67:
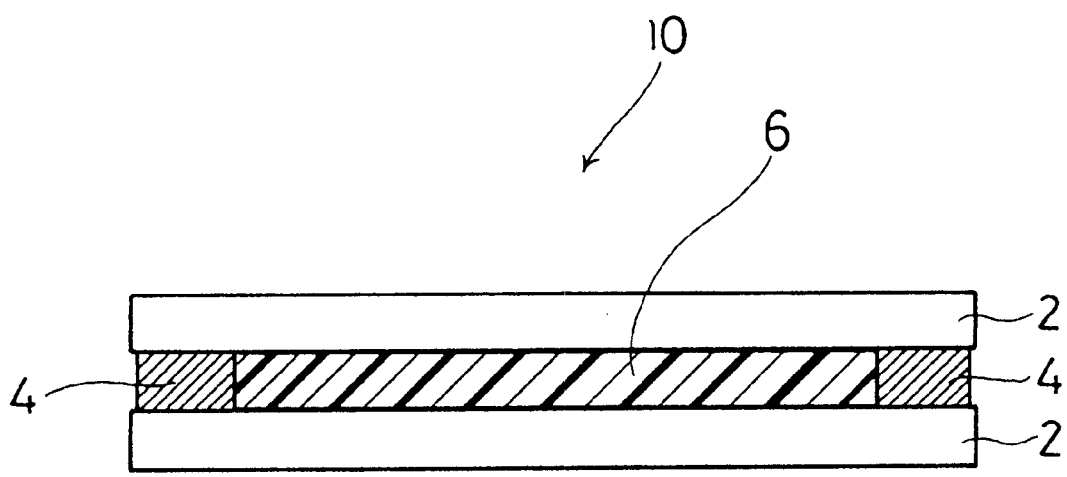
FIG. 67 is an illustration of the design of a composite cell which pertains to the second embodiment.
Figure 68:
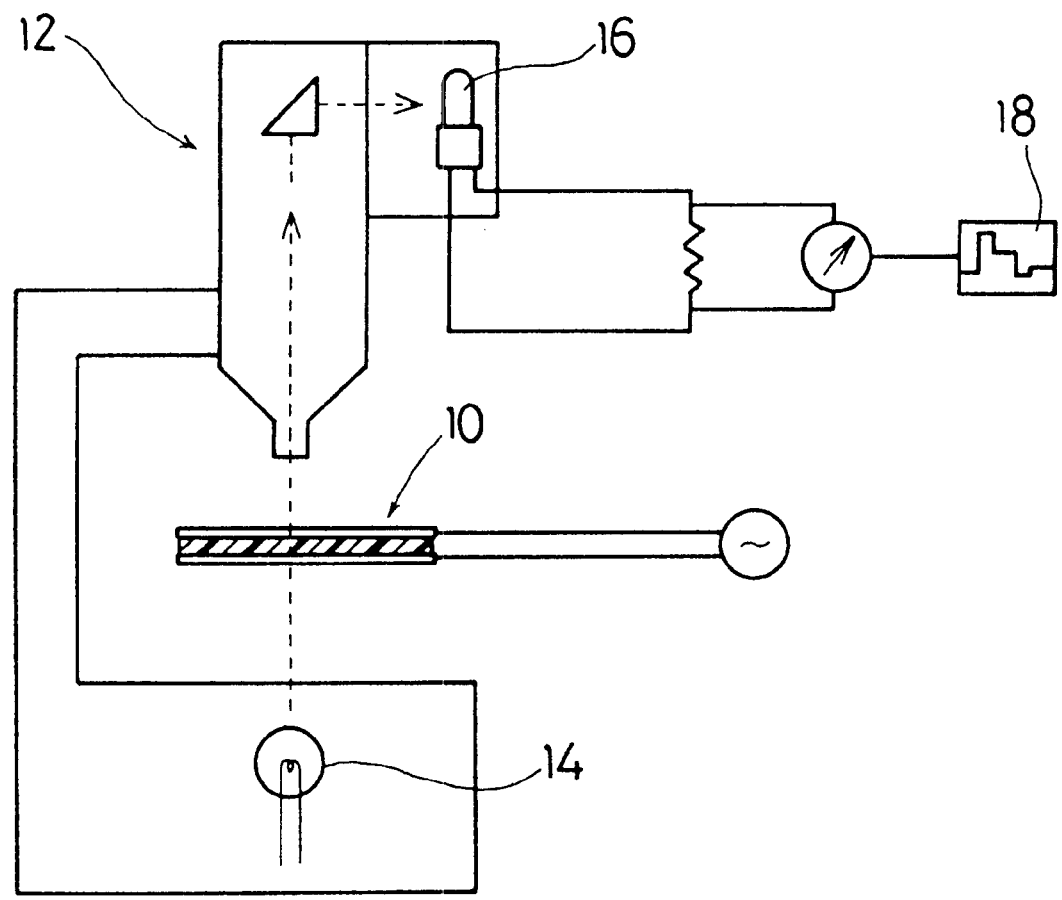
FIG. 68 is a simplified illustration of the design of a device for measuring the light transmission in a composite cell.

Experimental examples which further elucidate the present invention will be given below with reference to FIGS. 67 through 69. The present invention is not limited to or by these experimental examples.

In Experimental Example 5, a mixture comprising 39 wt % two-frequency-driving liquid crystalline substance (DF- 05XX, manufactured by Chisso), 41 wt % 2-hydroxyethyl methacrylate (manufactured by Wako Pure Chemical Industries), 17 wt % crosslinking agent (HX-620, manufactured by Nihon Kayaku) and 3 wt % photoinitiator (Darocure 1173 from Ciba-Geigy) was prepared. The mixture was sandwiched between ITO-equipped glass substrates 2, interposing 12 μm spacers 4. The assembly was irradiated with ultraviolet light (3.5 mW/cm²) for 180 seconds to form a liquid crystal/polymer composite 6 between the substrates, yielding the composite cell 10 depicted in FIG. 67.

In Experimental Example 6, composite cells were fabricated using the same two-frequency-driving liquid crystalline substance and the various constituent materials for the polymeric material that were used in Experimental Example 5, with the exception that an equal amount of R-167(Nihon Kayaku) was used in place of the crosslinking agent of Experimental Example 5. The two-frequency-driving liquid crystalline substance used in the foregoing experimental examples exhibits positive dielectric anisotropy in low-frequency fields, and negative dielectric anisotropy in high-frequency fields. The liquid crystal/polymer composites fabricated in Experimental Examples 5 and 6 were PNLC types.

As a comparative example, a mixture comprising 39 wt % of a liquid crystalline substance with positive dielectric anisotropy (E8, manufactured by BHI), 58 wt % 2-hydroxyethyl methacrylate (manufactured by Wako Pure Chemical Industries), and 3 wt % photoinitiator (Darocure 1173 from Ciba-Geigy) was prepared. This mixture was used to fabricate a composite cell by the procedure described in Experimental Example 5. The composite in this comparative example was also a PNLC type.

Next, the ability to switch between a transparent state and a light scattering state and memory of the respective states were evaluated for the composite cells prepared in Experimental Examples 5 and 6 and in the Comparative Example. The tests were conducted using the following procedures.
(1) The composite cells prepared in Experimental Examples 5 and 6 and in the Comparative Example were exposed to low frequency (60 Hz/100 V) and placed thereby in state 1.
(2) Application of the electric field to the composite cells in state 1 was halted to place the cells in state 2.
(3) In state 2, the cells were exposed to high frequency (20 kHz/100 V) and placed thereby in state 3.
(4) Application of the electric field to the composite cells in state 3 was halted to place the cells in state 4.

In this way, a total of four states were brought about by applying low-frequency and high-frequency electric fields, and by halting application thereof. Light transmission in each state was measured. The system used to measure light transmission is depicted in FIG. 63. A microscope 12 was used for the optical system and a halogen lamp provided to the microscope was used as the light source 14. The current output from a photomultiplier 16 was converted to voltage through connection in series to 200Ω resistors. A pen recorder 18 was used for readout. A Power Amplifier Model S-4750 manufactured by NF□Electronic Instruments was used for applying the electric field to the cell 10 and for adjusting the applied frequency. During light transmission measurement, a blank cell filled with water was prepared using the same glass substrates and spacers as in Experimental Example 5, and current output values from the photomultiplier were measured using the same procedure as in the foregoing practical examples. The following equation was used in computing light transmission (%).

Light transmission(%) = (photomultiplier output of composite cell in each state)/ (photomultiplier output of blank cell) × 100

Results for light transmission in the states 1 through 4 are given in Table 1.

TABLE 1

|  | Light transmission (%) | | | |
| --- | --- | --- | --- | --- |
| c | State 1 | State 2 | State 3 | State 4 |
| Experimental Example 5 | 92 | 55 | 13 | 23 |
| Experimental Example 6 | 90 | 68 | 11 | 24 |
| Comparative example | 90 | 70 | 88 | 70 |

The results presented in Table 1 indicate that in Experimental Examples 5 and 6, a transparent state was produced when a low-frequency field was applied (state 1). While light transmission declined when application of the field was halted (state 2), the transparent state was sustained without becoming a light scattering state. When a change was made from state 2 to the application of a high-frequency field (state 3), light transmission declined sharply, producing a light scattering state. It was thus possible to demonstrate that light transmission could be switched by applying fields of different frequencies. When application of the field was halted (state 4), a slight rise in light transmission was observed, but the light scattering state was sustained.

Figure 69:
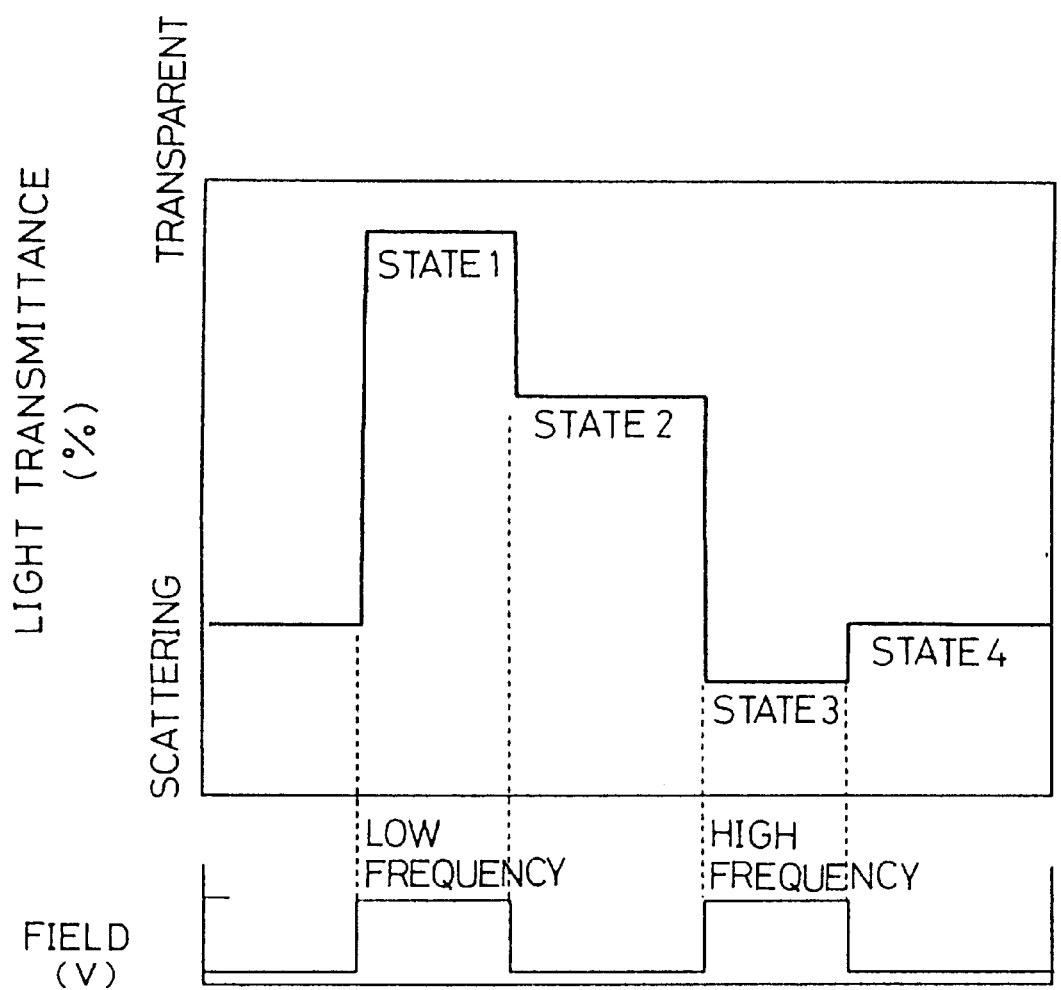
FIG. 69 is a diagram depicting a model of the change in light transmission in the second embodiment.

The changes in light transmission produced in the experimental examples are depicted in FIG. 69. The FIG. clearly indicates that in the composite cells 10 of Experimental Examples 5 and 6, light transmission could be controlled and a transparent state and a light scattering state could be produced in states 1 and 3. In addition, it was possible to switch between these states using electrical fields of different frequency. In states 2 and 4, it was possible to sustain the state of orientation (a transparent state or light scattering state) produced just previously during field application, demonstrating that the liquid crystal cells of Experimental Examples 5 and 6 could memorize a transparent state or light scattering state. In addition, the change in light transmission in the absence of an applied field (states 2 and 4) was monitored over 60 days for the cells of Experimental Examples 5 and 6. The transparent state and light scattering state were sustained, demonstrating that memory could be sustained continuously.

In the comparative example in state 1, it was possible to produce a transparent state just as in Experimental Examples 5 and 6, and when application of the field was subsequently halted (state 2), it was possible to sustain the transparent state. In short, it was possible to memorize the transparent state.

When a high-frequency field was applied (state 3), there was virtually no change in orientation due to the positive dielectric anisotropy of the liquid crystal, and the transparent state persisted. Thus, in the comparative example, it proved impossible to switch between a transparent state and a light scattering state. In addition, while memory in the transparent state was provided by the functional groups of the polymeric material, it was impossible to cancel this state of orientation.

What is claimed is:

1. A liquid crystal optical device comprising:

a pair of substrates; and a liquid crystal composition provided between said pair of substrates;

wherein the liquid crystal composition comprises a liquid crystalline substance and an orientation-sustaining material capable of sustaining at least two different states of orientation of said liquid crystalline substance in the absence of application of external stimulus; and at least one of the sustained states of orientation of the liquid crystal composition is produced by application of external stimulus to the optical display and can be changed through application of electrical energy.

2. The liquid crystal optical device as defined in claim 1, wherein at least one member of the pair of substrates is capable of elastic deformation, wherein at least one of the states of orientation is generated in response to external force applied to the substrate.

3. A method of changing states of orientation of the liquid crystalline substance of the liquid crystal device as defined in claim 1, comprising the step of:

substantially erasing the state of orientation through the application of electrical energy in excess of a state of orientation threshold level.

4. The method as defined in claim 3 wherein the external stimulus to change the state of orientation is provided by a finger, pen, typing machine, stamp or dot printer.

5. An optical device comprising:

a composition of a liquid crystalline substance disposed within a transparent polymer matrix having closed or open cells provided between a pair of substrates, the liquid crystalline substance being a two-frequency-driving liquid crystalline substance, wherein the liquid crystalline substance assumes a light scattering orientation state in response to a first frequency signal and assumes a light transmitting orientation state in response to a second frequency signal; and said polymer matrix is capable of sustaining each state of orientation of said two-frequency-driving liquid crystalline substance after the removal of electric signals.

6. The optical device as described in claim 5, wherein said polymer matrix comprises at least one functional group selected from the group consisting of hydroxyl groups, amide groups, amino groups, urea groups, urethane groups, carboxyl groups, and phenolic groups.

7. A method for using the optical device as described in claim 5, comprising the steps of:

switching the optical device to a transparent state by applying to the optical device an electrical signal of the second frequency for driving said liquid crystalline substance; and switching the optical device to a light scattering state by applying to the optical device an electrical signal of the first frequency.

8. The method for using the optical device as described in claim 5, comprising the steps of:

switching a local area of the optical device to a transparent state by applying locally the electrical signal of the second frequency; and switching the local area to a light scattering state by applying the electrical signal of the first frequency.

9. A liquid crystal display device, comprising:

a pair of substrates; and a liquid crystal composition provided between said pair of substrates, wherein said liquid crystal composition has at least two different orientation states, such that in order to cause said liquid crystal composition to change between any two orientation states, application of an external stimulus is necessary, and wherein upon removal of said external stimulus, said liquid crystal composition orientation remains the same as when said external stimulus was applied.

10. The liquid crystal display device of claim 9, wherein said external stimulus is a member selected from an electrical field, a finger, a pen, typing machine, a stamp and a dot printer.

11. An optical device according to claim 5 wherein at least one member of the pair of substrates is capable of elastic deformation and at least one of the states of orientation is generated in response to external force applied to the substrate.

* * * * *